(12) United States Patent
Xia et al.

(10) Patent No.: US 11,417,209 B2
(45) Date of Patent: Aug. 16, 2022

(54) METHOD, APPARATUS, AND STORAGE MEDIUM FOR DISPLAYING TRIP STRATEGY BASED ON PUBLIC TRANSPORTATION

(71) Applicant: BEIJING XIAOMI MOBILE SOFTWARE CO., LTD., Beijing (CN)

(72) Inventors: Yuhang Xia, Beijing (CN); Xiang Meng, Beijing (CN); Qin Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 380 days.

(21) Appl. No.: 16/582,367

(22) Filed: Sep. 25, 2019

(65) Prior Publication Data

US 2020/0312147 A1 Oct. 1, 2020

(30) Foreign Application Priority Data

Mar. 28, 2019 (CN) .......................... 201910245061.7

(51) Int. Cl.
*G08G 1/123* (2006.01)
*G06F 16/25* (2019.01)
(Continued)

(52) U.S. Cl.
CPC ......... *G08G 1/123* (2013.01); *G01C 21/3423* (2013.01); *G01C 21/3484* (2013.01); *G01C 21/3492* (2013.01); *G01C 21/3676* (2013.01); *G06F 16/252* (2019.01); *G06F 16/29* (2019.01); *G06F 3/04847* (2013.01)

(58) Field of Classification Search
CPC ....... G08G 1/123; G06F 16/252; G06F 16/29; G06F 3/04847; G01C 21/3423; G01C 21/3484; G01C 21/3492; G01C 21/3676
See application file for complete search history.

(56) References Cited

U.S. PATENT DOCUMENTS 11,168,993 B1 * 11/2021 Tsoupko-Sitnikov ......................
G01C 21/30
2016/0356624 A1 * 12/2016 O'Beirne .............. G06T 11/001
(Continued)

FOREIGN PATENT DOCUMENTS

CN 106679683 A 5/2017
CN 107270927 A 10/2017
(Continued)

OTHER PUBLICATIONS

Extended European Search Report in EP 19210171.5 dated Jan 21, 2020.
(Continued)

*Primary Examiner* — Hussein Elchanti
(74) *Attorney, Agent, or Firm* — Syncoda LLC; Feng Ma

(57) ABSTRACT

A method and an apparatus for displaying a travelling strategy based on public transportation can improve user travel experience. When the user appears in a first preset range of the starting public station, the first public transportation travelling strategy can be automatically acquired and displayed on the designated interface for the user's reference. The user does not need to take the initiative to perform multiple steps to check the travelling strategy displayed on the designated interface, which can have lower requirements on the user and can improve the operation efficiency.

19 Claims, 16 Drawing Sheets

(51) Int. Cl.
*G06F 16/29* (2019.01)
*G01C 21/34* (2006.01)
*G01C 21/36* (2006.01)
*G06F 3/04847* (2022.01)

(56) References Cited

U.S. PATENT DOCUMENTS

| | | | | |
|---|---|---|---|---|
| 2016/0356625 | A1* | 12/2016 | O'Beirne | G01C 21/367 |
| 2017/0010118 | A1* | 1/2017 | Hajj | G08G 1/012 |
| 2017/0358113 | A1* | 12/2017 | Bray | G01C 21/3667 |
| 2018/0157669 | A1* | 6/2018 | Naghdy | G06F 16/35 |
| 2019/0120639 | A1* | 4/2019 | Song | G08G 1/005 |
| 2021/0299701 | A1* | 9/2021 | Lopez, III | B62J 6/20 |

FOREIGN PATENT DOCUMENTS

| | | |
|---|---|---|
| CN | 107798412 A | 3/2018 |
| CN | 108286980 A | 7/2018 |
| WO | 2018095145 A1 | 5/2018 |
| WO | 2018233664 A1 | 12/2018 |
| WO | 2019009414 A1 | 1/2019 |

OTHER PUBLICATIONS

"How to use public transit directions in Google Maps Android Central", Anonymous, Mar. 29, 2017; XP055657186.
"Hop aboard! real-time information is now available for Kolkata's WBTC buses on Google Maps" Jul. 23, 2017; XP055657149.
"Google Maps: Everything you need to know" Anonymous, Dec. 26, 2017; XP055657190.
"Google Maps adds new Commute tab that shows your bus or train in real time—BGR", Chris Smith, Oct. 1, 2018, XP055656317.
"All aboard! Now Jakarta commuters will know when their bus is actually arriving", Anonymous, Jul. 21, 2016 XP055657218.
Europe 1st Office Action in Application No. 19210171.5, dated Mar. 9, 2021.
CN First Office Action in Application No. 201910245061.7, dated Apr. 16, 2020.

* cited by examiner

METHOD, APPARATUS, AND STORAGE MEDIUM FOR DISPLAYING TRIP STRATEGY BASED ON PUBLIC TRANSPORTATION

CROSS-REFERENCE TO RELATED APPLICATIONS

The present application claims priority to Chinese Patent Application No. 201910245061.7 filed on Mar. 28, 2019, the entire contents of which are incorporated herein by reference.

BACKGROUND

At present, travelling by public transportation has become a popular way of travelling in daily lives. However, due to a large number of public transportation routes and intertwining of the different public transportation routes, which constitute a complex public transportation system, it may bring a lot of stress to users on travelling.

SUMMARY

The present disclosure relates generally to the field of computer technologies, and more specifically to a method and an apparatus for displaying a travelling strategy based on public transportation and a storage medium.

The present disclosure provides a method and an apparatus for displaying a travelling strategy based on public transportation and a storage medium, which can solve the problems of the related art. The technical solution is as follows.

According to a first aspect of the embodiments of the present disclosure, there is provided a method for displaying a travelling strategy based on public transportation, the method including:

determining that a current location is within a first preset range of a starting public station in first travelling habit information, the first travelling habit information including at least a starting public station and a terminating public station corresponding to the starting public station;

acquiring a first public transportation travelling strategy, the first public transportation travelling strategy including a public transportation route from the starting public station directed to the terminating public station; and displaying the first public transportation travelling strategy on the designated interface.

In some embodiments, acquiring a first public transportation travelling strategy includes at least one of:

acquiring a distance between the current location and the starting public station;

acquiring a route between the current location and the starting public station;

acquiring a time length required to walk from the current location to the starting public station;

acquiring a travelling time length corresponding to the public transportation route;

acquiring an arrival time determined according to the travelling time length corresponding to the public transportation route and a current time;

acquiring a punctuality rate of public transportation vehicles travelling on the public transportation route;

acquiring traffic state information of a public transportation road section between the starting public station and the terminating public station of the public transportation route; or acquiring a waiting time length, the waiting time length being, among a plurality of public transportation vehicles travelling on the public transportation route, a time length required for a public transportation vehicle having the shortest distance to the starting public station to arrive at the starting public station.

In some other embodiments, acquiring a first public transportation travelling strategy includes:

acquiring a public transportation route from the starting public station directed to the terminating public station, and excluding the congested and faulty route sections.

In some other embodiments, the first travelling habit information further includes a designated public transportation route, the designated public transportation route including a starting public station and terminating public station; and acquiring a first public transportation travelling strategy includes:

acquiring the designated public transportation route from the starting public station directed to the terminating public station.

In some other embodiments, the first travelling habit information further includes a preset departure time period; and determining that a current location is within a first preset range of a starting public station in first travelling habit information includes:

determining that the current location is within the first preset range of the starting public station in the first travelling habit information, and the current time belongs to the preset departure time period.

In some other embodiments, the method further includes at least one of:

acquiring first travelling habit information provided by a third-party server;

displaying a designated interface, the designated interface including a travelling habit setting area, and acquiring the first travelling habit information input in the travelling habit setting area; or acquiring a historical travelling record, the historical travelling record including a plurality of public transportation routes, and each public transportation route including at least a starting public station and a terminating public station corresponding to each other; and performing statistics on the plurality of public transportation routes to acquire the first travelling habit information.

In some other embodiments, the method further includes:

when the first travelling habit information has not been acquired, displaying first prompt information on the designated interface, the first prompt information for prompting the user to input the first travelling habit information in the travelling habit setting area.

In some other embodiments, the method further includes:

when a distance between the public transportation vehicle corresponding to the first public transportation travelling strategy and the starting public station is less than a first preset threshold, sending second prompt information, the second prompt information for prompting the user that the public transportation vehicle is about to arrive.

In some other embodiments, displaying the first public transportation travelling strategy on the designated interface includes at least one of:

displaying a first preset number of public transportation vehicles in the top of a short-to-long order of waiting time lengths on the designated interface;

displaying a second preset number of public transportation routes in the top of a short-to-long order of travelling time lengths on the designated interface; or displaying a third preset number of public transportation vehicles in the top of an early-to-late order of arriving times on the designated interface.

In some other embodiments, the method further includes:

determining that the current location is within a second preset range of a starting location in second travelling habit information, the second travelling habit information including at least a starting location and a terminating location corresponding to the starting location;

when the current state information satisfies a public transportation travelling condition, acquiring a second public transportation travelling strategy, the second public transportation travelling strategy including a public transportation route from a public station corresponding to the starting location directed to a public station corresponding to the terminating location; and displaying the second public transportation travelling strategy on the designated interface.

In some other embodiments, acquiring a second public transportation travelling strategy includes:

the second travelling habit information further including a driving travelling mode and a vehicle identification of a designated vehicle, and when the designated vehicle is prohibited from travelling according to a driving restriction rule and the vehicle identification, acquiring the second public transportation travelling strategy.

In some other embodiments, acquiring a second public transportation travelling strategy includes at least one of:

the second travelling habit information further including a walking travelling mode or a bicycle travelling mode, and when the current weather is bad weather, acquiring the second public transportation travelling strategy;

the second travelling habit information further including a walking travelling mode or a bicycle travelling mode, acquiring a starting location, a terminating location and an arrival time of a travelling route corresponding to the walking travelling mode, or acquiring a starting location, a terminating location and an arrival time of a travelling route corresponding to the bicycle travelling mode, and when the acquired arrival time is later than a preset arrival time at the terminating location, acquiring the second public transportation travelling strategy; or the second travelling habit information further including a walking travelling mode or a bicycle travelling mode, and when the current time is later than the preset departure time at the starting location, acquiring the second public transportation travelling strategy.

In some other embodiments, acquiring a second public transportation travelling strategy includes:

the second travelling habit information further including a subway travelling mode, when there is no subway route with a first subway station corresponding to the starting location as a starting point and a second subway station corresponding to the terminating location as a termination and excluding faulty route section, acquiring the second public transportation travelling strategy.

According to a second aspect of embodiments of the present disclosure, there is provided an apparatus for displaying a travelling strategy based on public transportation, the apparatus including:

a first determining module configured to determine that a current location is within a first preset range of a starting public station in first travelling habit information, the first travelling habit information including at least a starting public station and a terminating public station corresponding to the starting public station;

a first policy acquiring module configured to acquire a first public transportation travelling strategy, the first public transportation travelling strategy including a public transportation route from the starting public station directed to the terminating public station; and a first displaying module configured to display the first public transportation travelling strategy on the designated interface.

In some embodiments, the first policy acquiring module includes at least one of:

a distance acquiring unit configured to acquire a distance between the current location and the starting public station;

a first route acquiring unit configured to a route between the current location and the starting public station;

a walking-time-length acquiring unit configured to acquire a time length required to walk from the current location to the starting public station;

a travelling-time-length acquiring unit configured to acquire a travelling time length corresponding to the public transportation route;

an arrival-time acquiring unit configured to acquire an arrival time determined according to the travelling time length corresponding to the public transportation route and a current time;

a punctuality-rate acquiring unit configured to acquire a punctuality rate of public transportation vehicles travelling on the public transportation route;

a state-information acquiring unit configured to acquire traffic state information of a public transportation road section between the starting public station and the terminating public station of the public transportation route; or a waiting-time-length acquiring unit configured to acquire a waiting time length, the waiting time length being, among a plurality of public transportation vehicles travelling on the public transportation route, a time length required for a public transportation vehicle having the shortest distance to the starting public station to arrive at the starting public station.

In some other embodiments, the first policy acquiring module includes:

a second route acquiring unit configured to acquire a public transportation route from the starting public station directed to the terminating public station, and excluding the congested and faulty route sections.

In some other embodiments, the first travelling habit information further includes a designated public transportation route, the designated public transportation route including a starting public station and terminating public station; and the first policy acquiring module includes:

a third route acquiring unit configured to acquire the designated public transportation route from the starting public station directed to the terminating public station.

In some other embodiments, the first travelling habit information further includes a preset departure time period; and the first determining module includes:

a determining unit configured to determine that the current location is within the first preset range of the starting public station in the first travelling habit information, and the current time belongs to the preset departure time period.

In some other embodiments, the apparatus further includes at least one of:

a first information acquiring module configured to acquire first travelling habit information provided by a third-party server;

a second information acquiring module configured to display a designated interface, the designated interface including a travelling habit setting area, and acquire the first travelling habit information input in the travelling habit setting area; or a third information acquiring module configured to acquire a historical travelling record, the historical travelling record including a plurality of public transportation routes, and each public transportation route including at least a starting public station and a terminating public station corresponding to each other; and perform statistics on the plurality of public transportation routes to acquire the first travelling habit information.

In some other embodiments, the apparatus further includes:

a first prompting module configured to, when the first travelling habit information has not been acquired, display first prompt information on the designated interface, the first prompt information for prompting the user to input the first travelling habit information in the travelling habit setting area.

In some other embodiments, the apparatus further includes:

a second prompting module configured to, when a distance between the public transportation vehicle corresponding to the first public transportation travelling strategy and the starting public station is less than a first preset threshold, send second prompt information, the second prompt information for prompting the user that the public transportation vehicle is about to arrive.

In some other embodiments, the first displaying module includes at least one of:

a first displaying unit configured to display a first preset number of public transportation vehicles in the top of a short-to-long order of waiting time lengths on the designated interface;

a second displaying unit configured to display a second preset number of public transportation routes in the top of a short-to-long order of travelling time lengths on the designated interface; or a third displaying unit configured to display a third preset number of public transportation vehicles in the top of an early-to-late order of arriving times on the designated interface.

In some other embodiments, the apparatus further includes a second determining module configured to determine that the current location is within a second preset range of a starting location in second travelling habit information, the second travelling habit information including at least a starting location and a terminating location corresponding to the starting location;

a second policy acquiring module configured to, when the current state information satisfies a public transportation travelling condition, acquire second public transportation travelling strategy, the second public transportation travelling strategy including a public transportation route from a public station corresponding to the starting location directed to a public station corresponding to the terminating location; and a second displaying module configured to display the second public transportation travelling strategy on the designated interface.

In some other embodiments, the second policy acquiring module includes:

the second travelling habit information further including a driving travelling mode and a vehicle identification of a designated vehicle, and a first policy acquiring unit configured to, when the designated vehicle is prohibited from travelling according to a driving restriction rule and the vehicle identification, acquire the second public transportation travelling strategy.

In some other embodiments, the second policy acquiring module includes at least one of:

the second travelling habit information further including a walking travelling mode or a bicycle travelling mode, and a second strategy acquiring unit configured to acquire the second public transportation travelling strategy when the current weather is bad weather;

the second travelling habit information further including a walking travelling mode or a bicycle travelling mode, and, and a third strategy acquiring unit configured to acquire a starting location, a terminating location and an arrival time of a travelling route corresponding to the walking travelling mode, or acquire a starting location, a terminating location and an arrival time of a travelling route corresponding to the bicycle travelling mode, and when the acquired arrival time is later than a preset arrival time at the terminating location, acquire the second public transportation travelling strategy; and the second travelling habit information including a walking travelling mode or a bicycle travelling mode, and, and a fourth policy acquiring unit configured to acquire the second public transportation travelling strategy when the current time is later than the preset departure time at the starting location.

In some other embodiments, the second policy acquiring module includes:

the second travelling habit information further including a subway travelling mode, and a fifth strategy acquiring unit configured to acquire the second public transportation travelling strategy when there is no subway route with a first subway station corresponding to the starting location as a starting point and a second subway station corresponding to the terminating location as a termination and excluding faulty route section.

According to another aspect of embodiments of the present disclosure, there is provided an apparatus for displaying a travelling strategy based on public transportation, the apparatus including:

one or more processors;

a volatile or non-volatile memory for storing one or more processor-executable instructions;

wherein the one or more processors are configured to:

determining that a current location is within a first preset range of a starting public station in first travelling habit information, the first travelling habit information including at least a starting public station and a terminating public station corresponding to the starting public station;

acquiring a first public transportation travelling strategy, the first public transportation travelling strategy including a public transportation route from the starting public station directed to the terminating public station; and displaying the first public transportation travelling strategy on the designated interface.

According to another aspect of the embodiments of the present disclosure, there is provided a computer-readable storage medium, wherein the computer readable storage medium stores at least one instruction loaded and executed by a processor to implement operations performed in the method for displaying a travelling strategy based on public transportation according to the first aspect.

It is to be understood that both the foregoing general description and the following detailed description are exemplary and explanatory only, and are not restrictive of the scope of disclosure.

BRIEF DESCRIPTION OF THE DRAWINGS

The accompanying drawings, which are part of this disclosure, illustrate embodiments consistent with the disclosure and, together with the description, serve to explain the principles of various embodiments of the disclosure.

DETAILED DESCRIPTION

Figure 1:
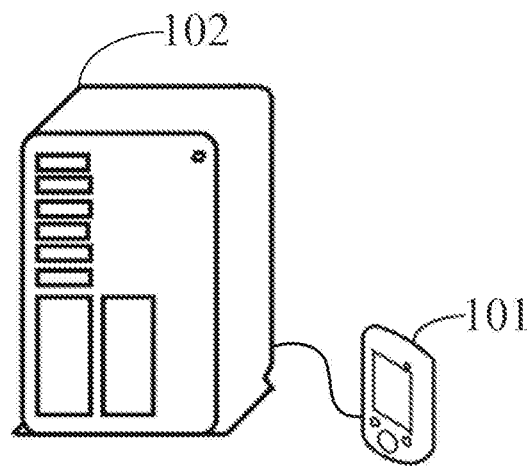
FIG. 1 is a schematic diagram of an implementation environment according to some embodiments.

Exemplary embodiments of the present disclosure will be described in detail and examples of the embodiments will be illustrated in the drawings. When the following description refers to the drawings, unless specified otherwise, the same numbers in different drawings represent the same or similar elements. The implementations described in the following exemplary embodiments do not represent all implementations consistent with the present disclosure, and instead they are merely examples of devices and methods consistent with aspects of the present disclosure as detailed in the appended claims.

In the present disclosure, in the absence of description to the contrary, orientation terms, such as "inner," "outer" or the like are generally in terms of a contour of the corresponding component. In addition, the terms such as "first" and "second" in embodiments of the present disclosure are used to distinguish one element from another element, and are not intended to indicate or imply any sequence or relative importance.

The inventors of the present disclosure have recognized that, how to determine a more convenient and efficient public transportation travelling strategy has become an urgent problem to be solved.

Typically, the user can start a third-party map application, and the third-party map application includes a starting location input field, a terminating location input field, a plurality of travelling modes, and a confirmation option. The user inputs a starting location in the starting location input field, enters a terminating location in the terminating location input field, selects a public transportation travelling mode from the plurality of travelling modes, and clicks the confirmation option. Then the third-party map application determines a public transportation route including the starting location and the terminating location, and displays the public transportation route for users' reference. However, the solution requires the user to perform multiple steps on its own initiative, which imposes high requirements on the user, and has low operation efficiency.

Before explaining the embodiments of the present disclosure in detail, some terms involved in the embodiments of the present disclosure may be first explained.

A public transportation vehicle may refer to a vehicle for a user to ride without limiting the identity of the user, such as a bus, a train, a metro, an aircraft, a ferry, a ship, or other vehicles used in public transportation.

The public transportation vehicle has a specific driving route, and the specific driving route may be provided with a plurality of public transportation vehicles for people to ride, and the driving routes corresponding to the different public transportation vehicles may be the same or different.

The specific driving route includes a plurality of public stations, and the public transportation vehicle travels according to the specific driving route, and stops at specific public stations during driving to allow people to get on or off the vehicle.

The specific driving route can include an up-going driving route and a down-going driving route, and the public transportation vehicle can alternately travel according to the prescribed up-going driving route and the down-going driving route, and the up-going driving route and the down-going driving route include the same public stations, but the travelling direction is opposite. Alternatively, the up-going driving route and the down-going driving route are different, and accordingly, the public stations included in the up-going driving route and the down-going driving route are also different.

A public transportation travelling mode may refer to the way users travel by public transportation vehicles.

When the user wants to travel, the user waits at a public station. When the public transportation vehicle arrives at the public station and stops at the public station, the user gets on the vehicle until the public transportation vehicle arrives at another public station and stops at the public station, and the user gets off and finishes the travel.

A designated interface may refer to a specific information presentation interface on an electronic device for aggregating and displaying various types of information.

The designated interface can be the main interface of the electronic device, or an application interface of an installed application, and can be other interfaces than the main interface of the electronic device and the application interface of the installed application, such as a minus one screen interface. The minus one screen interface can be the leftmost information presentation interface of a plurality of information presentation interfaces, and a rightward sliding operation performed on the main interface can call out the minus one screen interface.

The designated interface can include multiple display areas: a presentation area, a shortcut function area, and a dynamic information area. The presentation area can present some common information, such as time information, weather information, etc.; the shortcut function area can present multiple function options, such as a startup option of an application, a startup option of an application interface in the application, and a startup option of a tool, such as the start-up option of a sweep function; the dynamic information area can present recommended dynamic information, such as popular merchandise, train tickets, movie tickets, schedule information, stock quotes, travelling strategies, and so on.

Embodiments of the present disclosure provide a method and an apparatus for displaying a travelling strategy based on public transportation and a storage medium. The present disclosure will be described in detail below with reference to the accompanying drawings.

FIG. 1 is a schematic diagram of an implementation environment according to some embodiments. As shown in FIG. 1, the implementation environment includes an electronic device 101 and a server 102. The electronic device 101 and the server 102 are connected through a network. The electronic device 101 can be a plurality of types of devices such as a mobile phone, a computer, a tablet computer, and the like.

In some embodiments, the electronic device 101 acquires travelling habit information and a current location, formulates a travelling strategy according to the travelling habit information and the current location, and displays a travelling strategy in a designated interface. The user can check the travelling strategy displayed on the designated interface and travel based on the travelling strategy.

In some embodiments, the electronic device 101 acquires travelling habit information input by the user, and sends the travelling habit information to the server 102, such that the server 102 stores the travelling habit information and subsequently formulates a travelling strategy according to a current location of the electronic device 101 and the travelling habit information, sends the travelling strategy to the electronic device 101, for the electronic device 101 to display the travelling strategy on the designated interface. The user can check the travelling strategy displayed on the designated interface and travel based on the travelling strategy.

In some embodiments, the implementation environment further includes a third-party server 103 connected to the server 102 through a network, and the third-party server 103 is associated with a third-party application installed on the electronic device 101.

The third-party server 103 can acquire travelling habit information according to a history record in the third-party application, and formulate a travelling strategy for the user according to the current location of the electronic device 101 and travelling habit information, and send the travelling strategy to the server 102. The server 102 sends the travelling strategy to the electronic device 101 for the electronic device 101 to display the travelling strategy on the designated interface. The user can check the travelling strategy displayed on the designated interface and travel based on the travelling strategy.

Alternatively, the third-party server 103 acquires travelling habit information according to the history record in the third-party application, and sends the travelling habit information to the server 102. The server 102 formulates a travelling strategy for the user according to the current location of the electronic device 101 and the travelling habit information, and sends the travelling strategy to the electronic device 101. The travelling strategy is displayed by the electronic device 101 on the designated interface. The user can check the travelling strategy displayed on the designated interface and travel based on the travelling strategy.

Figure 2:
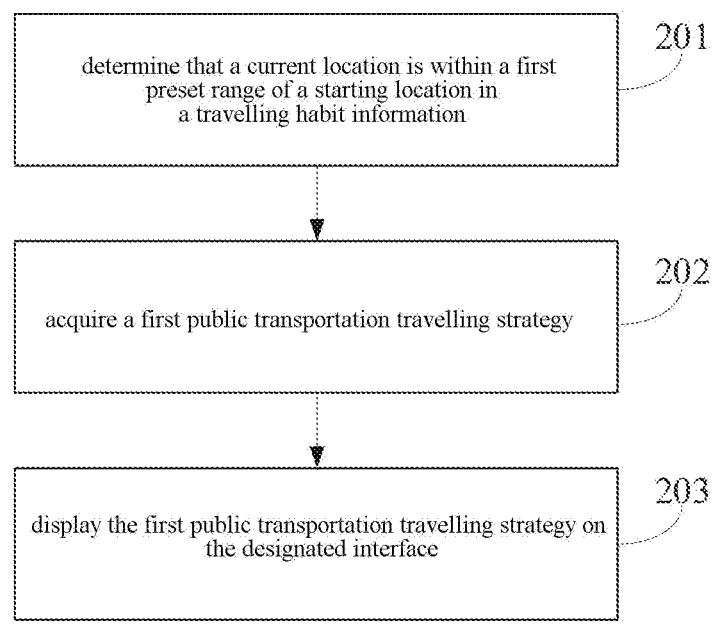
FIG. 2 is a flowchart of a method for displaying a travelling strategy based on public transportation according to some embodiments.

FIG. 2 is a flowchart of a method for displaying a travelling strategy based on public transportation according to some embodiments. As shown in FIG. 2, the method includes the following steps.

In step 201, it is determined that a current location is within a first preset range of a starting public station in first travelling habit information, the first travelling habit information including at least a starting public station and a terminating public station corresponding to the starting public station.

In step 202, a first public transportation travelling strategy is acquired, the first public transportation travelling strategy including a public transportation route from the starting public station directed to the terminating public station.

In step 203, the first public transportation travelling strategy is displayed on the designated interface.

In a method according to embodiments of the present disclosure, first travelling habit information can be acquired, including at least a starting public station and a terminating public station, and determines that the current location is within the first preset range of the starting public station, and acquires the first public transportation travelling strategy corresponding to the first travelling habit information and displays first public transportation travelling strategy on the designated interface. When the user appears in the first preset range of the starting public station of the habit, the travelling strategy can be automatically acquired and displayed on the designated interface for the user's reference. The user does not need to take the initiative to perform multiple steps to check the travelling strategy displayed on the designated interface, which can have lower requirements on the user and can improve the operation efficiency.

In some embodiments, acquiring a first public transportation travelling strategy includes at least one of the following:

acquiring a distance between the current location and the starting public station;

acquiring a route between the current location and the starting public station;

acquiring a time length required to walk from the current location to the starting public station;

acquiring a travelling time length corresponding to the public transportation route;

acquiring an arrival time determined according to the travelling time length corresponding to the public transportation route and a current time;

acquiring a punctuality rate of public transportation vehicles travelling on the public transportation route;

acquiring traffic state information of a public transportation road section between the starting public station and the terminating public station of the public transportation route; or acquiring a waiting time length, the waiting time length being, among a plurality of public transportation vehicles travelling on the public transportation route, a time length required for a public transportation vehicle having the shortest distance to the starting public station to arrive at the starting public station.

In some embodiments, acquiring the first public transportation travelling strategy includes:

acquiring a public transportation route from the starting public station directed to the terminating public station, and excluding the congested and faulty route sections.

In some embodiments, the first travelling habit information further includes a designated public transportation route, the designated public transportation route including a starting public station and terminating public station; and acquiring a first public transportation travelling strategy includes:

acquiring the designated public transportation route from the starting public station directed to the terminating public station.

In some embodiments, the first travelling habit information further includes a preset departure time period; and determining that the current location is within a first preset range of a starting public station in first travelling habit information includes:

determining that the current location is within the first preset range of the starting public station in the first travelling habit information, and the current time belongs to the preset departure time period.

In some embodiments, the method further includes at least one of the following:

acquiring first travelling habit information provided by a third-party server;

displaying a designated interface, the designated interface including a travelling habit setting area, and acquiring the first travelling habit information input in the travelling habit setting area; or acquiring a historical travelling record, the historical travelling record including a plurality of public transportation routes, and each public transportation route including at least a starting public station and a terminating public station corresponding to each other; and performing statistics on the plurality of public transportation routes to acquire the first travelling habit information.

In some embodiments, the method further includes:

when the first travelling habit information has not been acquired, displaying first prompt information on the designated interface, the first prompt information being for prompting the user to input the first travelling habit information in the travelling habit setting area.

In some embodiments, the method further includes:

when the distance between the public transportation vehicle corresponding to the first public transportation travelling strategy and the starting public station is less than a first preset threshold, sending second prompt information, the second prompt information being for prompting the user that the public transportation vehicle is about to arrive.

In some embodiments, displaying the first public transportation travelling strategy on the designated interface includes at least one of the following:

on the designated interface, displaying a first preset number of public transportation vehicles in a short-to-long order of waiting time lengths;

on the designated interface, displaying a second preset number of public transportation routes in a short-to-long order of travelling time lengths; or on the designated interface, displaying a third preset number of public transportation vehicles in an early-to-late order of arriving times.

In some embodiments, the method further includes:

determining that the current location is within a second preset range of a starting location in second travelling habit information, the second travelling habit information including at least a starting location and a terminating location corresponding to the starting location;

when the current state information satisfies a public transportation travelling condition, acquiring a second public transportation travelling strategy, the second public transportation travelling strategy including a public transportation route from a public station corresponding to the starting location directed to a public station corresponding to the terminating location; and displaying the second public transportation travelling strategy on the designated interface.

In some embodiments, acquiring a second public transportation travelling strategy includes:

the second travelling habit information further including a driving travelling mode and a vehicle identification of a designated vehicle, and when the designated vehicle is decided to be prohibited from travelling according to a driving restriction rule and the vehicle identification, acquiring the second public transportation travelling strategy.

In some embodiments, acquiring the second public transportation travelling strategy includes at least one of the following:

the second travelling habit information further including a walking travelling mode or a bicycle travelling mode, and when the current weather is bad weather, acquiring the second public transportation travelling strategy;

the second travelling habit information further including a walking travelling mode or a bicycle travelling mode, acquiring a starting location, a terminating location and an arrival time of a travelling route corresponding to the walking travelling mode, or acquiring a starting location, a terminating location and an arrival time of a travelling route corresponding to the bicycle travelling mode, and if the acquired arrival time is later than a preset arrival time at the terminating location, acquiring the second public transportation travelling strategy; or the second travelling habit information further including a walking travelling mode or a bicycle travelling mode, and if the current time is later than the preset departure time at the starting location, acquiring the second public transportation travelling strategy.

In some embodiments, acquiring a second public transportation travelling strategy includes:

the second travelling habit information further including a subway travelling mode, if there is no subway route with a first subway station corresponding to the starting location as a starting point and a second subway station corresponding to the terminating location as a termination and excluding faulty route section, acquiring the second public transportation travelling strategy.

In daily lives, the same user's travel can include various types such as daily commute to and from office, travelling for pleasure or shopping trips, and different users' travelling habits are also different. Therefore, in order to formulate a suitable travelling strategy for the user, it is necessary to first acquire the travelling habit information of the user.

The approaches to acquire travelling habit information can include at least one of the following:

Approach 1: Acquire the travelling habit information provided by the third-party server.

Third-party applications that help users travel, such as map applications, taxi applications, etc., can be installed in electronic devices, and third-party applications are associated with third-party servers.

To protect user privacy, the user identifications can be encrypted, hashed, or hidden, and users can opt out the data collection.

In some embodiments, in order to acquire a travelling strategy through a third-party application when the user performs a daily commute, the current travelling information can be input in a third-party application, and the travelling information can include a starting location and a terminating location, and can also include a travelling mode, etc.

Therefore, the third-party server can collect the travelling information input by the user multiple times, and perform statistics on the collected travelling information to acquire the travelling habit information that can reflect the user's personal travelling habits.

In some embodiments, a user accustomed to using a third-party application can set a commonly used starting location and terminating location in a third-party application, such as setting a home location and a company location in a third-party map application. The third-party server can acquire the starting location and the terminating location commonly used by the user, and acquire the travelling habit information including the starting location and the terminating location.

In addition, the user can also set a common travelling mode in the third-party application, and the third-party server acquires the travelling habit information including the starting location, the terminating location, and the travelling mode.

Afterwards, the third-party server sends the acquired travelling habit information to the server connected to the electronic device, and then the travelling strategy is formulated by the server, or the acquired travelling habit information is sent to the electronic device through the server connected to the electronic device, and subsequently the travelling strategy is formulated by the electronic device.

It should be noted that, according to different travelling modes, the acquired travelling habit information is different, and the travelling habit information acquired by the above manner 1 includes first travelling habit information and second travelling habit information, wherein the first travelling habit information is travelling habit information in the public transportation travelling mode and the second travelling habit information is travelling habit information under other travelling modes than the public transportation travelling mode.

In an embodiment of the present disclosure, the first public transportation travelling strategy can be acquired according to the first travelling habit information, and when some unexpected situations occur under other travelling modes, the second public transportation travelling strategy can be acquired according to the second travelling habit information.

Approach 2: Acquire the travelling habit information set by the user.

The electronic device displays a designated interface, and the designated interface includes a travelling habit setting area. The user can input the travelling habit information in the travelling habit setting area, and the electronic device acquires the travelling habit information input by the user.

Figure 3:
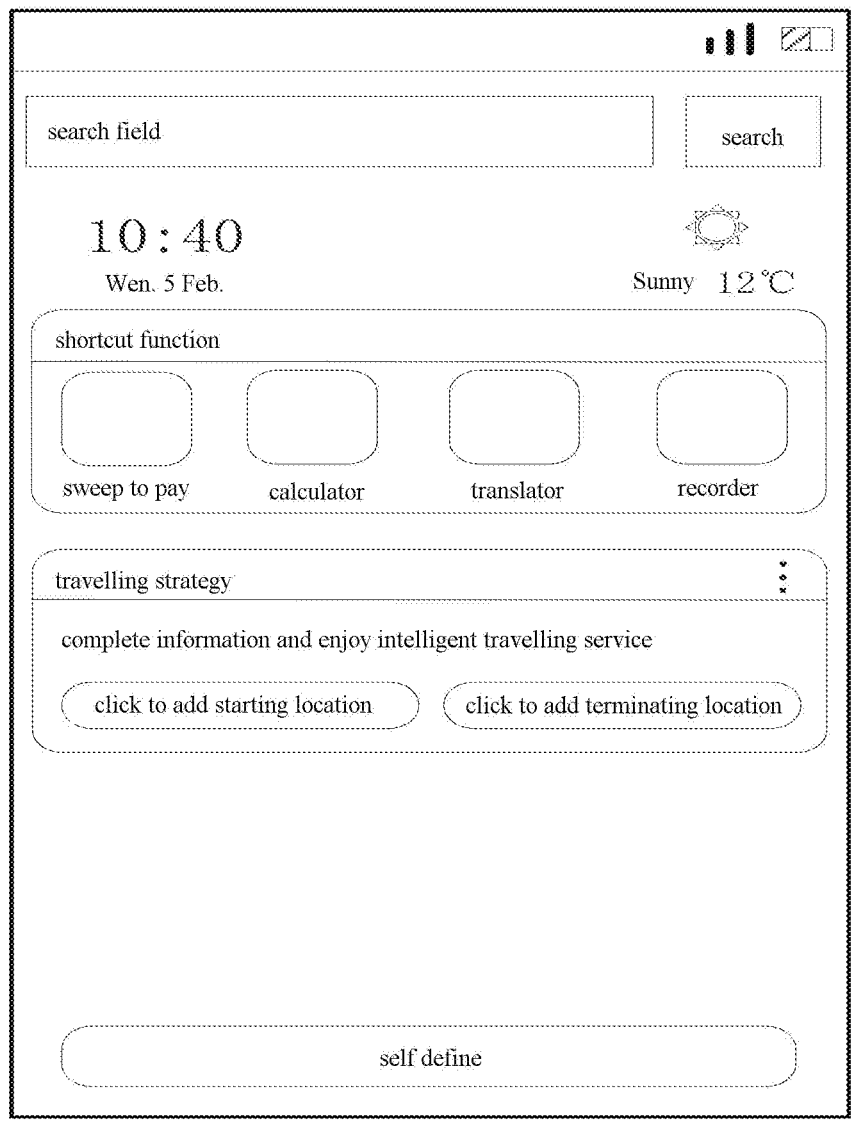
FIG. 3 is a schematic diagram of a travelling habit setting area according to some embodiments.

Referring to FIG. 3, the designated interface includes a travelling habit setting area, and the travelling habit setting area includes a starting location setting area and a terminating location setting area. The user can input a starting location in the starting location setting area, and input a terminating location in the terminating location setting area. The electronic device can acquire travelling habit information including the starting location and the terminating location.

In addition, the travelling habit setting area can further include a plurality of travelling modes including at least one of a driving travelling mode, a public transportation travelling mode, a taxi travelling mode, a subway travelling mode, a walking travelling mode, and a bicycle travelling mode. The user can select any travelling mode from the plurality of travelling modes as the designated travelling mode. The electronic device can acquire the travelling habit information including the starting location, the terminating location, and the designated travelling mode.

In addition, the travelling habit setting area can further include a travelling time setting field. The user can set one or more preset departure times in the travelling time setting field, and the electronic device acquires a preset departure time period containing the preset departure time according to the preset departure time set by the user. The electronic device can acquire the travelling habit information including the starting location, the terminating location and the preset departure time period, so as to formulate a travelling strategy for the user when the current time belongs to the preset departure time period.

In some embodiments, in order to facilitate the user to set more comprehensive travelling habit information, the travelling habit setting area can be associated with the setting interface, and the user can click any location of the travelling habit setting area to jump to the setting interface, for the user to set travelling habit information in the setting interface.

Figure 4:
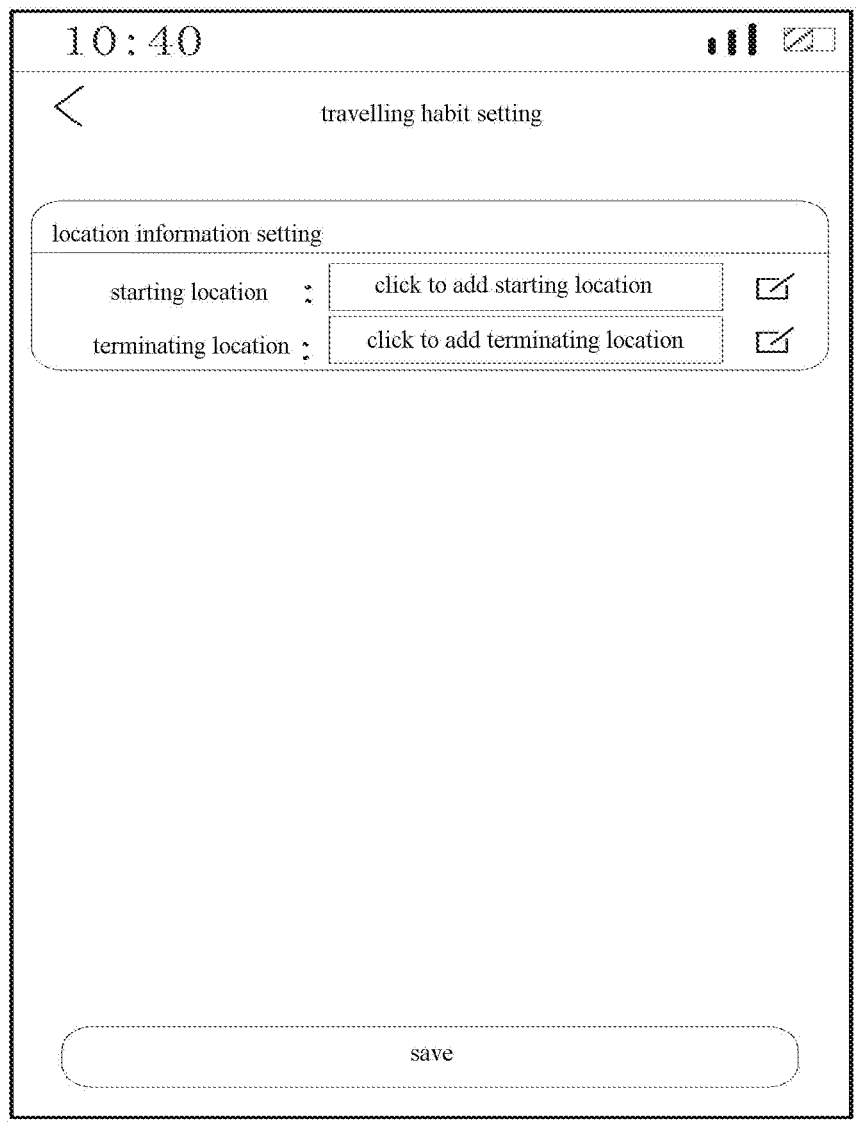
FIG. 4 is a schematic diagram of a setting interface according to some embodiments.

For example, referring to FIG. 4, the setting interface includes a starting location setting area and a terminating location setting area, and the user can input a starting location in the starting location setting area, input a terminating location in the terminating location setting area. Or, the user clicks the starting location setting area, and the electronic device displays an electronic map, for the user to select a starting location in the electronic map; then, the user clicks the terminating location setting area, and the electronic device displays an electronic map, for the user to select the terminating location in the electronic map.

Figure 5:
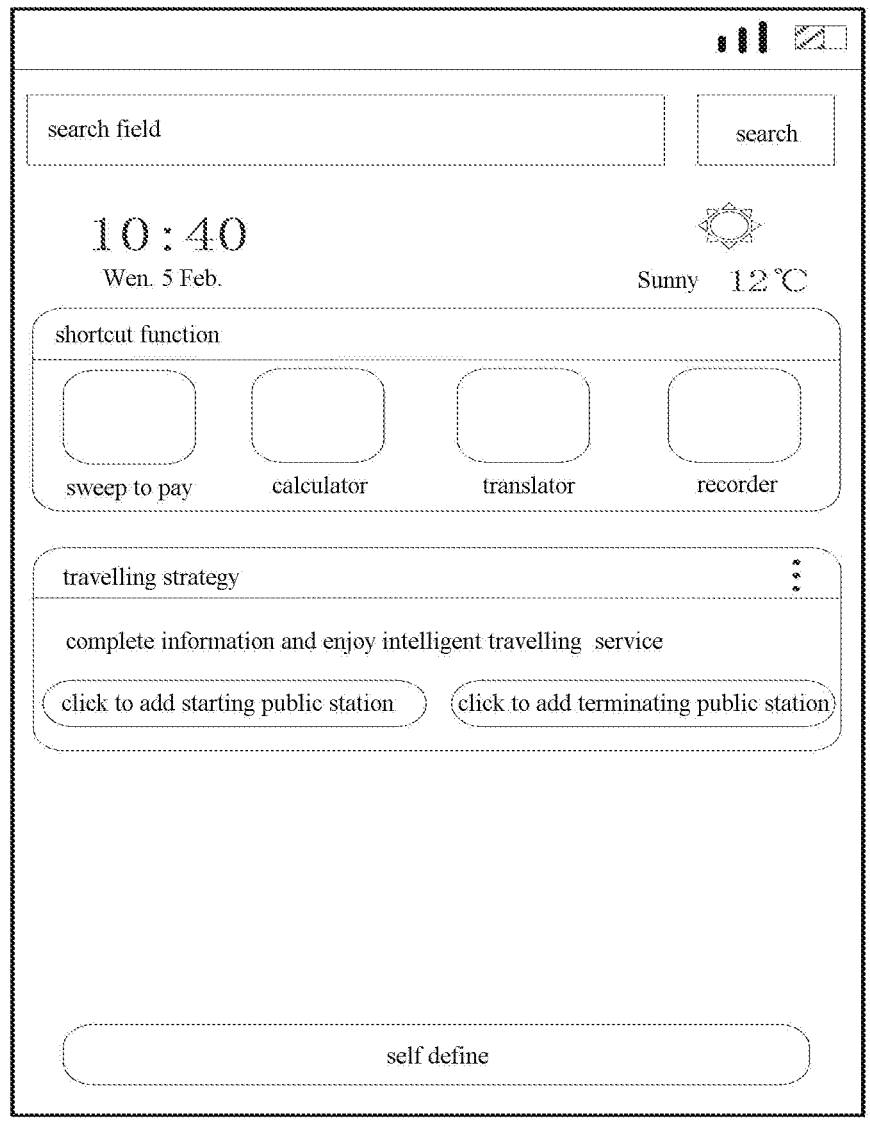
FIG. 5 is a schematic diagram of another travelling habit setting area according to some embodiments.

Referring to FIG. 5, when the travelling mode is the public transportation travelling mode, the designated interface displays a travelling habit setting area, where the travelling habit setting area includes a starting public station setting area and a terminating public station setting area, and the user can input a starting public station in the starting public station setting area, and input a terminating public station in the terminating public station setting area. The electronic device can acquire the first travelling habit information including the starting public station and terminating public station.

In some embodiments, the travelling habit setting area can be associated with a first setting interface, where the first setting interface includes a starting public station setting area and a terminating public station setting area. The user can input a starting public station in the starting public station setting area, and input a terminating public station in the terminating public station setting area.

Figure 6:
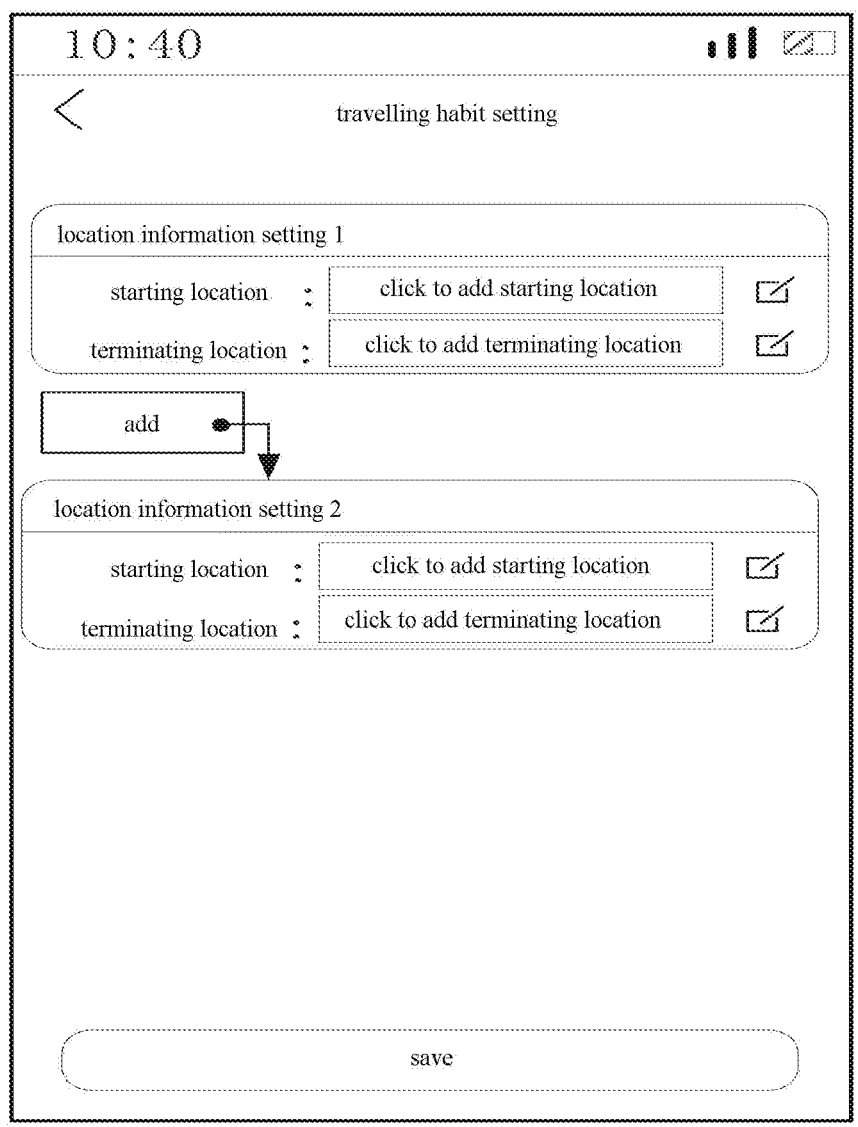
FIG. 6 is a schematic diagram of another setting interface according to some embodiments.

Referring to FIG. 6, the setting interface further includes an "add" button. After setting a travelling habit information, the user can also click the "add" button to set the next travelling habit information.

Figure 7:
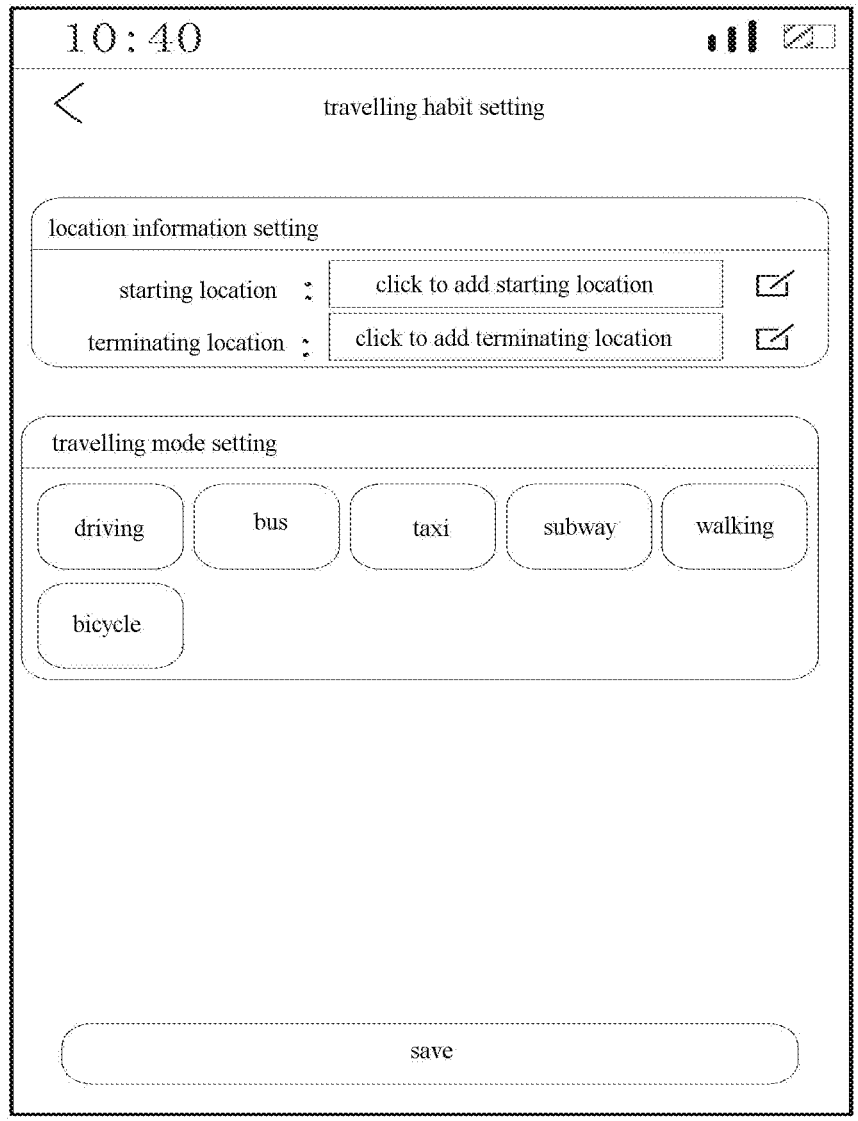
FIG. 7 is a schematic diagram of another setting interface according to some embodiments.

Referring to FIG. 7, the setting interface further includes at least one of a driving travelling mode, a public transportation travelling mode, a taxi travelling mode, a subway travelling mode, a walking travelling mode, and a bicycle travelling mode, for the user to select a designated travelling mode.

Figure 8:
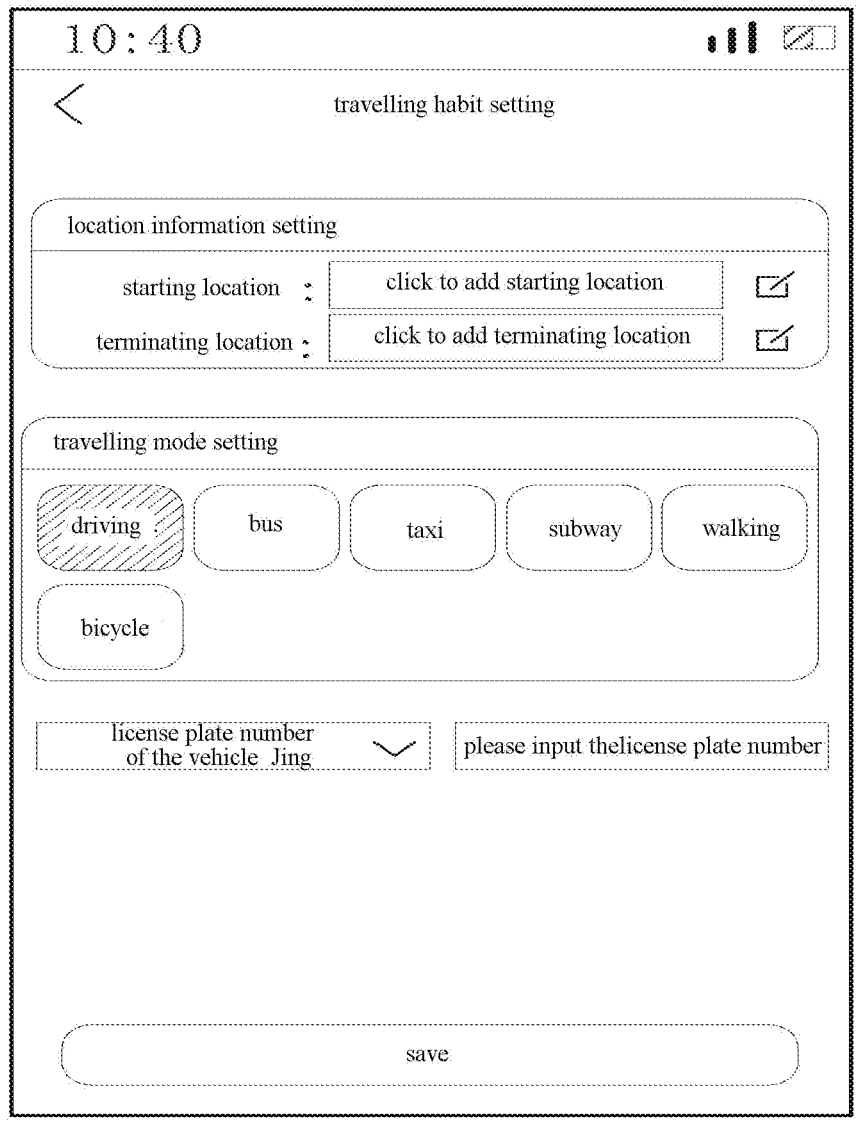
FIG. 8 is a schematic diagram of another setting interface according to some embodiments.

Referring to FIG. 8, when the user selects the driving travelling mode as the designated travelling mode, the setting interface can correspondingly display a vehicle identification input field, and the user can input the vehicle identification of the vehicle for the driving travelling, in the vehicle identification input field. The vehicle identification can be the license plate number of the vehicle, or the engine serial number of the vehicle, etc.

Figure 9:
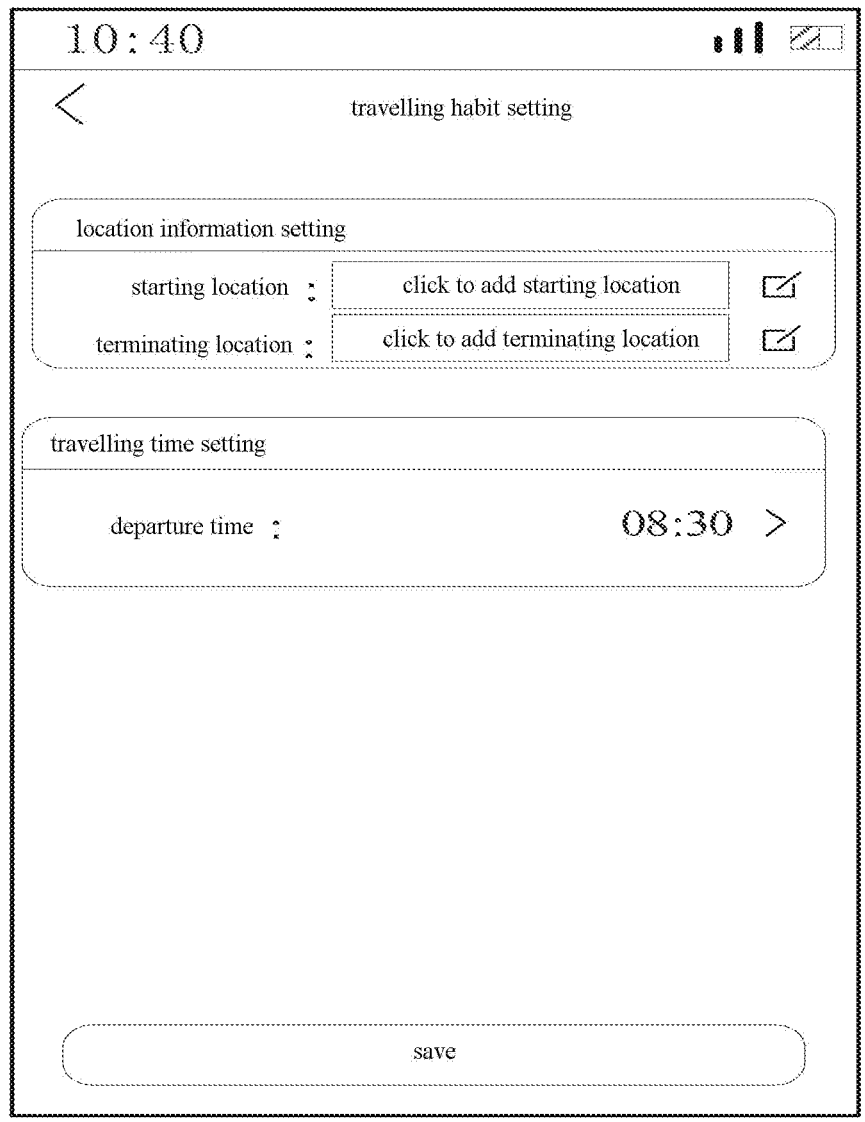
FIG. 9 is a schematic diagram of another setting interface according to some embodiments.

Referring to FIG. 9, the setting interface further includes a travelling time setting field. The user can set the preset departure time to 8:30 in the travelling time setting field, and the electronic device can set the preset departure time period to be 8:20-8:30.

The travelling habit information can include a plurality of pieces of information, and when the plurality of pieces of information have not been set completely, the user needs to be prompted.

In some embodiments, when any travelling habit information is not acquired, or the acquired travelling habit information is incomplete, an information completing button can be displayed in the travelling habit setting area of the designated interface. When it is detected a triggering operation by the user on the information completing button, it jumps to a setting interface for the user to continue to complete the travelling habit information on the setting interface.

In some embodiments, when any travelling habit information is not acquired, prompt information can be displayed in the travelling habit setting area of the designated interface, the prompt information is for prompting the user to input the travelling habit information in the travelling habit setting area.

For example, when the designated travelling mode is the public transportation travelling mode, and the first travelling habit information has not been acquired, first prompt information can be displayed in the travelling habit setting area of the designated interface, here the first prompt information is for prompting the user to input first travelling habit information in the travelling habit setting area.

Figure 10:
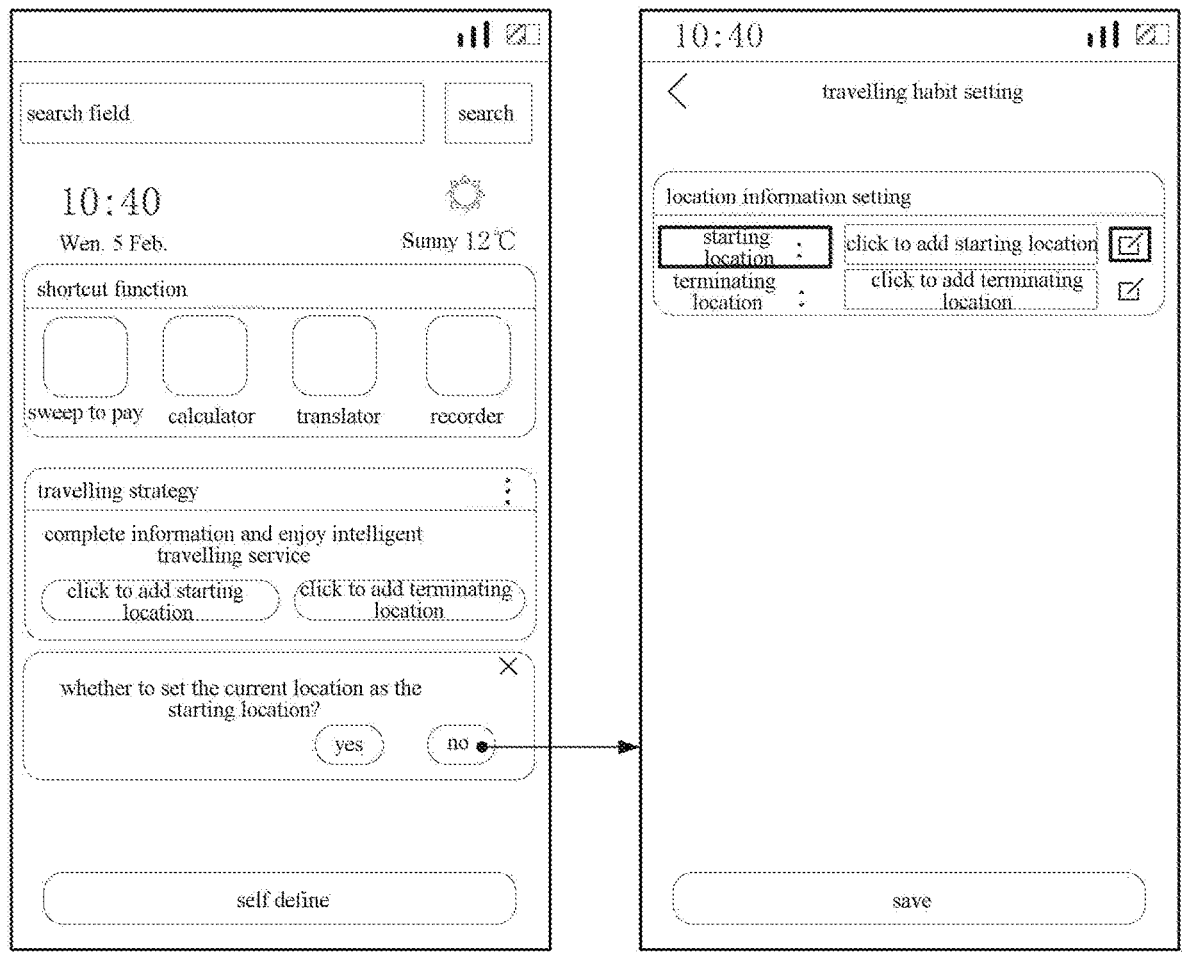
FIG. 10 is a schematic diagram showing the display of first inquiry information according to some embodiments.

Referring to FIG. 10, in some embodiments, when the travelling habit information is not acquired, first inquiry information can be displayed on the designated interface, the first inquiry information for inquiring whether the current location of the user is the starting location. The user does not need to input the starting location, and only needs to confirm or deny the first inquiry information.

When a confirmation operation on the first inquiry information by the user is detected, the current location is set as the starting location, and when a denial operation on the first inquiry information by the user is detected, the setting interface is displayed, and the starting location setting area is highlighted, to facilitate the user to set the starting location.

Figure 11:
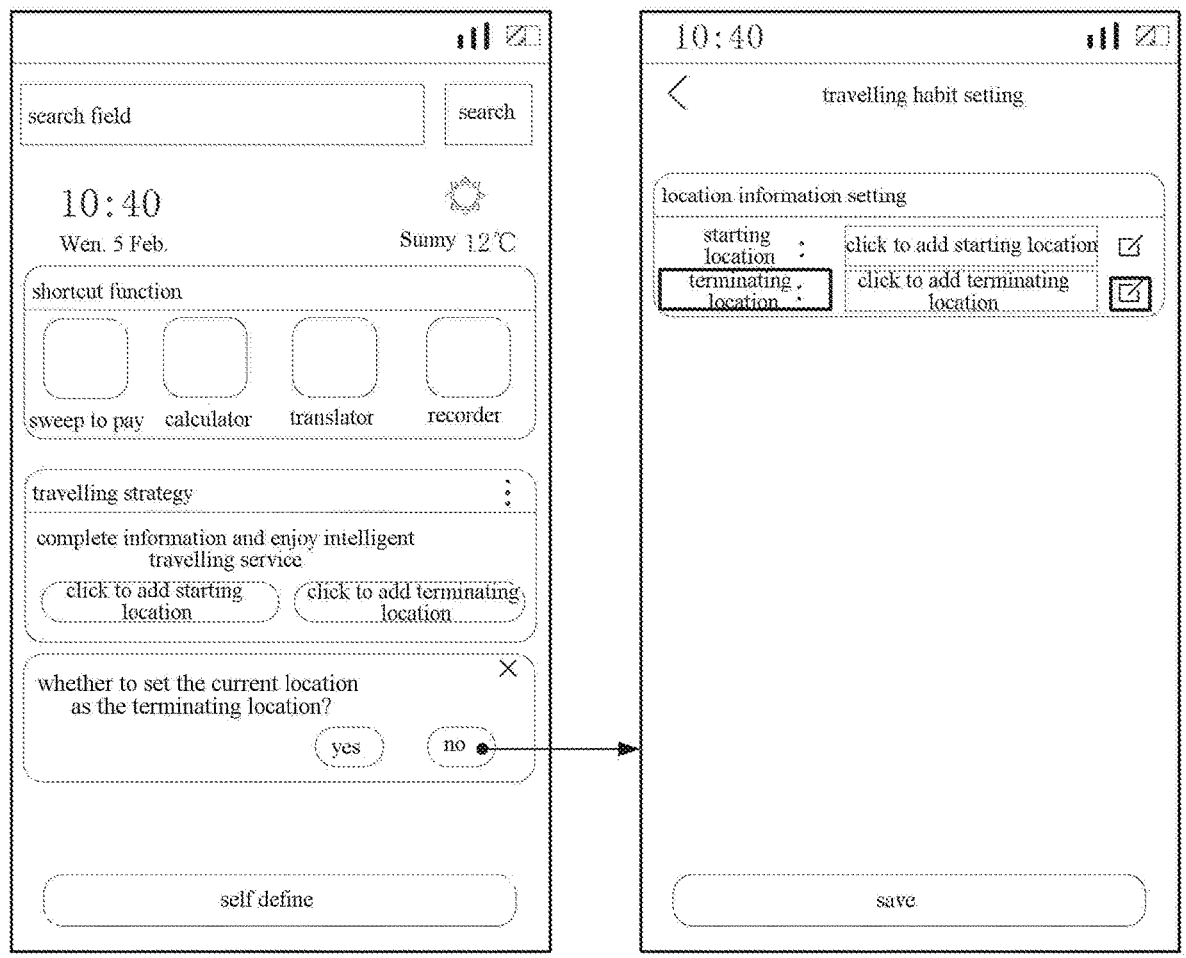
FIG. 11 is a schematic diagram showing the display of second inquiry information according to some embodiments.

Referring to FIG. 11, in some embodiments, when the travelling habit information is not acquired, second inquiry information can be displayed on the designated interface, the second inquiry information for inquiring whether the current location of the user is the terminating location. The user does not need to input the terminating location, and only needs to confirm or deny the second inquiry information.

When a confirmation operation on the second inquiry information by the user is detected, the current location is set as the terminating location, and when a denial operation on the second inquiry information by the user is detected, the setting interface is displayed, and the terminating location setting area is highlighted, to facilitate the user to set the terminating location.

Figure 12:
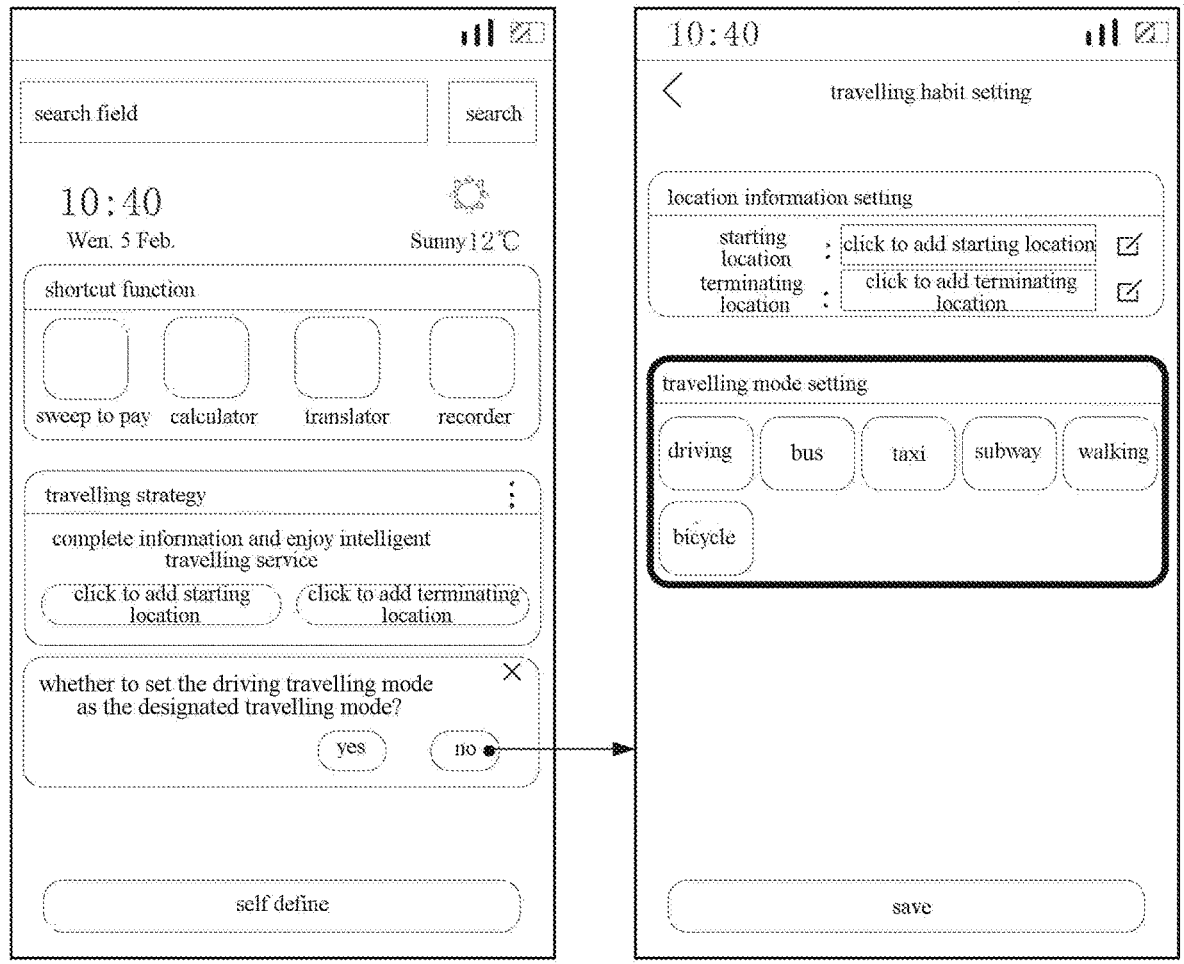
FIG. 12 is a schematic diagram showing the display of third inquiry information according to some embodiments.

Referring to FIG. 12, in some embodiments, when the designated travelling mode is not acquired, third inquiry information can be displayed on the designated interface, the third inquiry information for inquiring whether the user travels in a certain designated travelling mode. The user does not need to set the designated travelling mode, and only needs to confirm or deny the third inquiry information.

When a confirmation operation on the third inquiry information by the user is detected, the travelling mode is determined to be the designated travelling mode, and when a denial operation on the third inquiry information by the user is detected, the setting interface is displayed, and the travelling mode setting area is highlighted, to facilitate the user to set the designated travelling mode.

Figure 13:
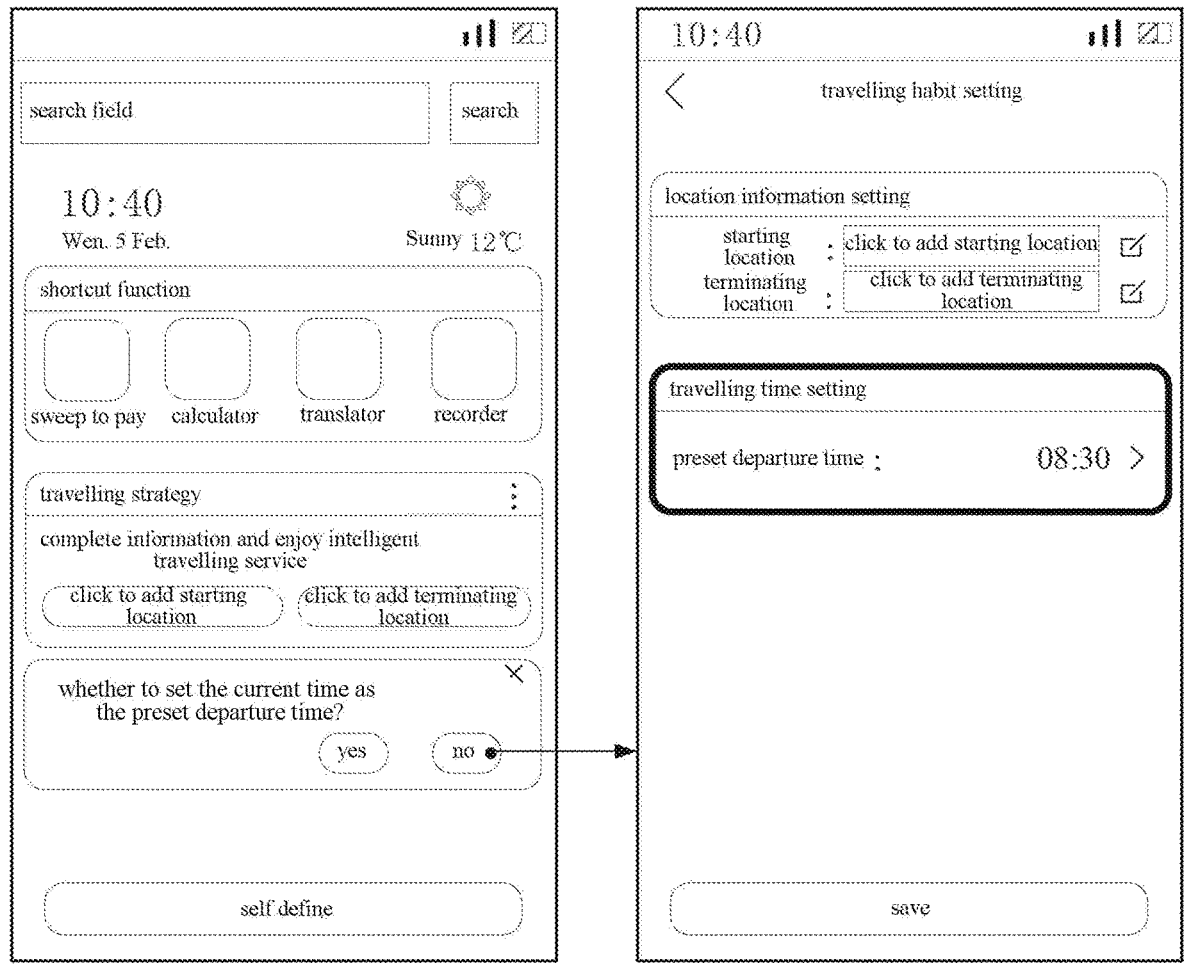
FIG. 13 is a schematic diagram showing the display of fourth inquiry information according to some embodiments.

Referring to FIG. 13, in some embodiments, the travelling habit information includes a preset departure time period. When the preset departure time period is not acquired, fourth inquiry information can be displayed on the designated interface, the fourth inquiry information for inquiring the user whether a certain time period to which the current time belongs is the preset departure time period. The user does not need to set a preset departure time period, and only needs to confirm or deny the fourth inquiry information.

When a confirmation operation on the fourth inquiry information by the user is detected, the time period is determined as a preset departure time period, and when a denial operation on the fourth inquiry information by the user is detected, the setting interface is displayed, and the travelling time setting area is highlighted, to facilitate the user to set the preset departure time.

The prompting information is used to prompt the user, or inquiry information is used to inquire the user, so that more travelling habit information of the user can be acquired, and the travelling strategy acquired is more accurate when the travelling strategy is acquired based on more travelling habit information.

Approach 3: Acquire a historical travelling record of the user, the historical travelling record including a plurality of travelling routes, and perform statistics on the historical travelling record to acquire travelling habit information.

During the travelling process of the user, the electronic device performs positioning, records the location of the electronic device, and can acquire a historical travelling record of the user, where the historical travelling record includes multiple travelling routes of the user, and each travelling route includes at least a starting location and a terminating location. By performing statistics on the plurality of travelling routes, the travelling habit information of the user can be acquired.

When the travelling mode of the user is the public transportation travelling mode, the acquired historical travelling record includes a plurality of public transportation routes, and each public transportation route includes at least a starting public station and a terminating public station corresponding to each other. Statistics is performed on the plurality of public transportation routes to acquire first travelling habit information of the user.

Through the above three approaches, the travelling habit information of the user can be acquired, and the travelling habit information includes at least a starting location and a terminating location, and can further include at least one of a designated travelling mode or a preset departure time period. Since the travelling habit information can reflect the personal habits and personal preferences of the user when travelling, the acquired travelling habit information can help to acquire a more accurate travelling strategy later. Even if not all the travelling habits have been acquired, more travelling habits can be acquired by prompting or inquiring, to complete the travelling habits.

It should be noted that, when acquiring the travelling habit information, any one of the above three manners can be adopted, or a combination of at least two of the above three manners can also be adopted.

Another point to be noted is that in addition to the above three manners, travelling habit information can be acquired in other ways.

Figure 14:
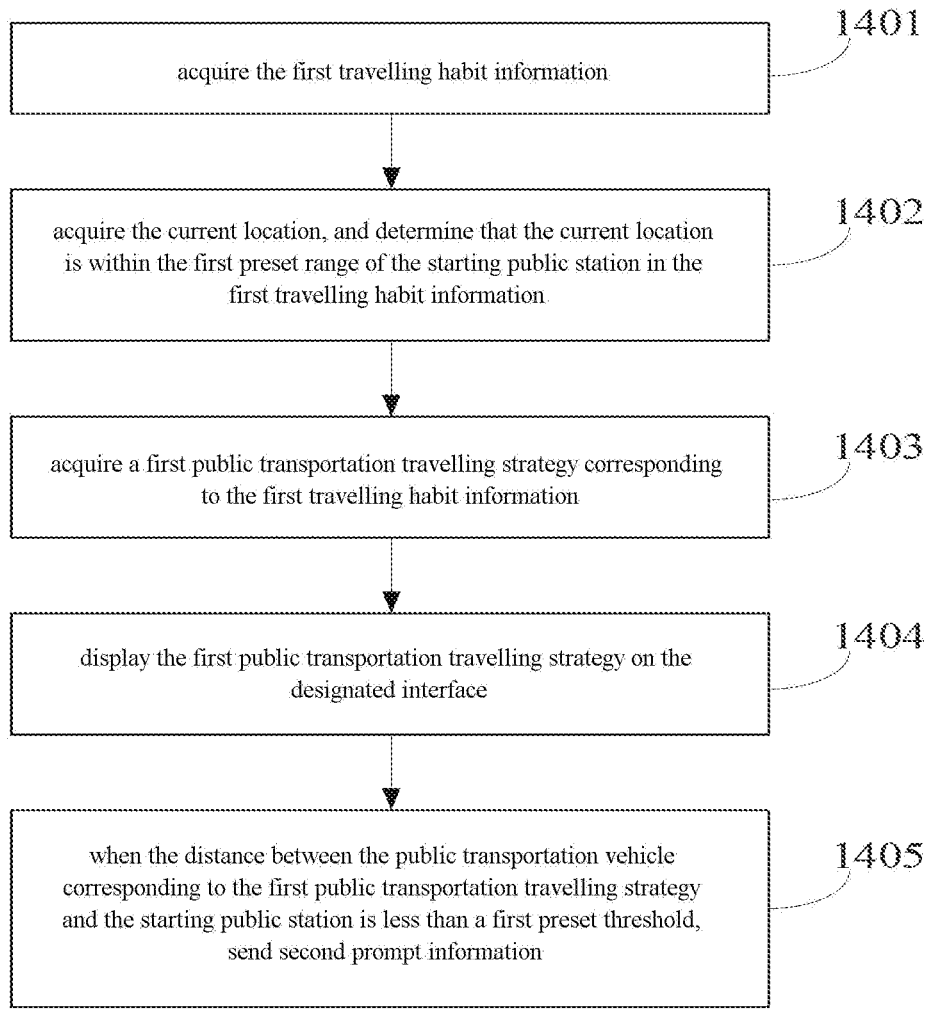
FIG. 14 is a flowchart of a method for displaying a travelling strategy based on public transportation according to some embodiments.

FIG. 14 is a flowchart of a method for displaying a travelling strategy based on public transportation according to some embodiments, illustrating a process of acquiring a public transportation travelling strategy according to the first travelling habit information. As shown in FIG. 14, the process includes following steps.

In step 1401, the first travelling habit information is acquired.

The first travelling habit information can include one or more pieces, and each piece of the first travelling habit information includes at least a starting public station and a terminating public station corresponding to each other, and a public transportation travelling mode for distinguishing from travelling habit information in other travelling modes.

In step 1402, the current location is acquired, and it is determined that the current location is within the first preset range of the starting public station in the first travelling habit information.

The electronic device acquires the current location, and determines whether the current location is within the first preset range of the starting public station according to the starting public station in the first travelling habit information and the current location. The process of acquiring the current location can be implemented based on a positioning function of the electronic device, or can be implemented based on other manners.

If the current location is within the first preset range of the starting public station, the user can be considered to be located near the starting public station, and it is very likely that the user is about to ride a public transportation vehicle from the starting public station to travel to the terminating public station corresponding to the starting public station. Therefore, the first public transportation travelling strategy corresponding to the first travelling habit information is recommended to the user. If the current location is not within the first preset range of the starting public station, then the user cannot be considered to be travelling, and there is no need to recommend a travelling strategy for the user.

Wherein, the first preset range refers to a circular range centered on the starting public station and having a radius of the first preset distance, or can be a square range centered on the starting public station, or can also be other types of scope.

In some embodiments, the server can adopt a geofence technology to set a virtual geographic boundary for each public station as a first preset range corresponding to the public station. Different public stations correspond to different first preset ranges.

Accordingly, if the electronic device is located within the virtual geographic boundary, it is determined that the current location of the electronic device is within a first preset range of the starting public station. The server determines that the current location of the electronic device is located in the first preset range of the starting public station, and can automatically associate the electronic device with the starting public station, and push the notification message related to the starting public station to the electronic device, such as driving situation of the public transportation vehicle about to arrive at the starting public station, and the like.

In some embodiments, the first travelling habit information further includes a preset departure time period. Then step 1402 can further include: acquiring a current location and a current time, and determining that the current location is within a first preset range of the starting public station in the first travelling habit information, and the current time belongs to the preset departure time period.

For example, the user usually picks up the bus from home between 8:00 and 9:00 to go to work, so the preset departure time period is set to 8:00-9:00. If the current time is 8:30, and the current location of the user is near the bus stop near the house, it is determined that the current location is within the first preset range of the bus stop, and the current time belongs to the preset departure time period. At this time, the corresponding first public transportation travelling strategy can be acquired for the user.

In step 1403, a first public transportation travelling strategy corresponding to the first travelling habit information is acquired.

Since the embodiment of the present disclosure is only taking the public transportation travelling mode as an example, step 1403 is only a description of the process of acquiring the first public transportation travelling mode under the public transportation travelling mode. The first public transportation travelling strategy acquired varies depending on different first travelling habit information.

The process of acquiring the first public transportation travelling strategy according to the first travelling habit information can include the following three situations.

(1) The first travelling habit information includes the starting public station, the terminating public station, and the public transportation travelling mode.

The process of acquiring the first public transportation travelling strategy corresponding to the first travelling habit information includes: acquiring a public transportation route from the starting public station directed to the terminating public station, the public transportation route indicating a travelling route starting from the starting public station to arrive at the terminating public station.

At present, there are many public transportation routes, and various public transportation routes are interlaced. Different public transportation routes can have the same public station. Therefore, when acquiring the first public transportation travelling strategy corresponding to the first travelling habit information, it is possible to acquire one or more public transportation routes from the starting public station directed to the terminating public station.

For example, the public transportation routes include a No. 1 up-going route, a No. 1 down-going route and a No. 2 route. The stopping stations of each of these three routes include public station A and public station B. The route between public station A and public station B of the No. 1 up-going route and the No. 1 down-going route is different from the route between public station A and public station B of the No. 2 route. The No. 1 up-going route and the No. 1 down-going route travelling the same route but with different travelling direction, which belong to different public transportation routes.

Due to the large number of vehicles on the road, in actual situations, there are usually road congestion situations or road failures. Therefore, in order to ensure determining first public transportation travelling strategy that is more suitable for user, in some embodiments, acquiring a public transportation route from the starting public station directed to the terminating public station includes: acquiring a public transportation route from the starting public station directed to the terminating public station and excluding a congested road segment and a faulty road segment.

In order to acquire the congestion situation and the fault condition of the road, in some embodiments, the traffic state information of each road can be acquired, and according to the traffic state information, among a plurality of public transportation routes from the starting public station directed to the terminating public station, a public transportation route not including a congested road section and a faulty road section is selected, as public transportation route from the starting public station directed to the terminating public station and excluding a congested road segment and a faulty road segment. Subsequently, when the user travels based on the public transportation route, the congested road section and the faulty road section can be bypassed. It can improve the travelling efficiency.

Wherein, the traffic state information includes at least road conditions, such as vehicle driving conditions and road traffic conditions. The vehicle driving conditions include the number and speed of vehicles travelling in the road, and can also include sudden situations such as vehicle faults or accidents. The road traffic conditions include traffic conditions on various roads, such as smooth roads or congested road. When the road is congested, the road traffic conditions can also include the length of the congested road section. The road traffic conditions can also include maintenance conditions or other conditions on the road. The traffic state information can be acquired by analyzing what is captured by monitoring devices fixed on the road, or can be acquired from capturing of moving monitoring devices in the air, or can be acquired from collected location information of vehicles.

Figure 15:
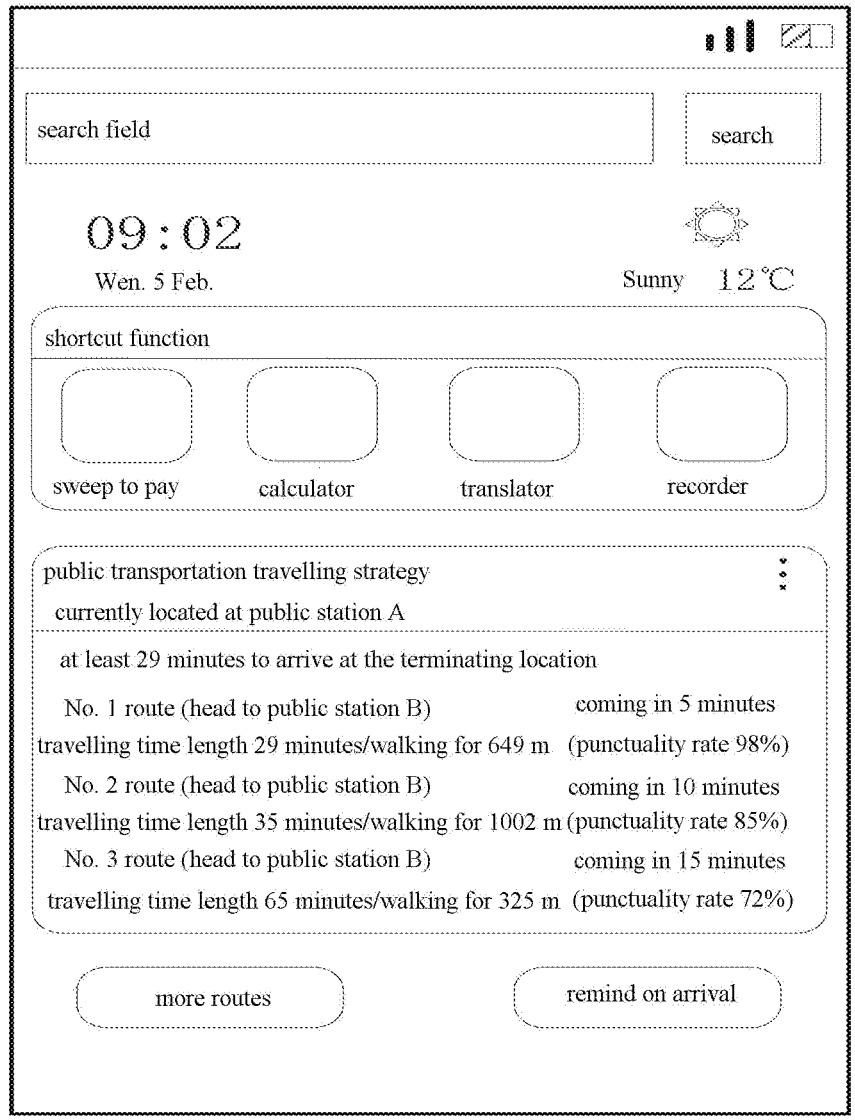
FIG. 15 is a schematic diagram showing a first public transportation travelling strategy according to some embodiments.

Referring to FIG. 15, in some embodiments, the process of acquiring the first public transportation travelling strategy corresponding to the first travelling habit information can further include at least one of the following.

1. Acquiring a distance between the current location and the starting public station.

The user usually needs to arrive at the starting public station from the current location in order to take the public transportation vehicle. Therefore, after the electronic device acquires the current location, the distance between the current location and the starting public station can be acquired and provided to the user as a travelling strategy.

2. Acquiring the route between the current location and the starting public station.

The route between the current location and the starting public station is acquired to be provided to the user as a travelling strategy, and the user can be presented with a route from the current location to the starting public station, so that the user can go to the starting public station based on the route.

3. Acquiring a time length required to walk from the current location to the starting public station.

When there is a certain distance between the current location and the starting public station, in order to enable the user to take the public transportation vehicle in time, or to help the user determine the time it takes from the current location to the starting public station, a time length required to walk from the current location to the starting public station can be acquired as a travelling strategy to be provided to the user.

The time length is determined according to the route and the walking speed, and the walking speed can be determined according to the average walking speed of the plurality of users, or can be determined according to the current average walking speed of the user.

4. Acquiring a travelling time length corresponding to the public transportation route.

After acquiring the public transportation route from the starting public station directed to the terminating public station, a travelling time length corresponding to the public transportation route can be determined according to the route and the speed of the public transportation vehicle, that is, a time length taken from the starting public station to the terminating public station, as a travelling strategy to be provided to the user.

Wherein, the speed of the public transportation vehicle is determined according to the average speed of all public transportation vehicles in the area where the public transportation vehicle is located.

5. Acquiring an arrival time determined according to the travelling time length corresponding to the public transportation route and a current time.

After acquiring the travelling time length corresponding to the public transportation route, the time after the travelling time length has elapsed since the current time is acquired. That is, the time to arrive at the terminating public station, i.e. an arrival time, can be acquired. The user can learn about the arrival time, and perform subsequent arrangement based on the arrival time.

For example, the user arrives at the starting public station at 8 o'clock, starts from the public station to the terminating public station. A friend waits at the terminating public station. When the user learns about the arrival time, the user can be informed the friend of the arrival time, and the friend can go to the terminating public station according to the arrival time, to avoid waiting for a longer period of time at the terminating public station.

6. Acquiring a punctuality rate of public transportation vehicles travelling on the public transportation route.

The punctuality rate of public transportation vehicles is a ratio of public transportation vehicles travelling according to public transportation routes and arriving at the designated public stations at specified times. The higher the punctuality rate, the higher the probability that public transportation vehicles can arrive at the designated public stations at specified times. The lower the punctuality rate, the lower the probability that public transportation vehicles can arrive at the designated public stations at specified times.

The punctuality rate of public transportation vehicles is closely related to the traffic status of public transportation routes. When there is congestion or other unexpected situations in public transportation routes, public transportation vehicles cannot be able to travel at normal speed, affecting the time of arrival at the designated public station, thus affecting the punctuality rate.

The punctuality rate is calculated based on the arrival status of a plurality of public transportation vehicles travelling according to the public transportation route, and can be provided to the user as a travelling strategy.

7. Acquiring traffic state information of a public transportation road section between the starting public station and the terminating public station of the public transportation route.

When a public transportation vehicle travels in a public transportation road section between the starting public station and the terminating public station, it can travel on an unblocked road all the way, and other situations can occur. Therefore, in order to acquire a more accurate public transportation route, traffic state information of a public transportation road section between the starting public station and the terminating public station of the public transportation route can be acquired to be provided to the user, and the user can learn about the traffic state of the public transportation route according to the traffic state information.

8. Acquiring a waiting time length, the waiting time length being, among a plurality of public transportation vehicles travelling on the public transportation route, a time length required for a public transportation vehicle having the shortest distance to the starting public station to arrive at the starting public station.

The user may have to wait for a while at the starting public station before they can take a public transportation vehicle. If it is not possible to determine the time when the public transportation vehicle arrives at the starting public station, even if the travelling time length corresponding to the public transportation route and the current time are acquired, the arrival time at the terminating public station cannot be determined, which causes inconvenience to the user.

There can be multiple public transportation vehicles on the same public transportation route, with a fixed interval between one another. When the user waits for a public transportation vehicle near the starting public station, the public transportation vehicle that will be taken is usually the public transportation vehicle closest to the starting public station. Therefore, among a plurality of public transportation vehicles travelling according to the public transportation route, the time length required for the public transportation vehicle closest to the starting public station to arrive at the starting public station is acquired, and the time length is determined as the waiting time length.

(2) The first travelling habit information includes the designated public transportation route in addition to the starting public station, the terminating public station, and the public transportation travelling mode.

The designated public transportation route includes a starting public station and a terminating public station.

Since different users have different travelling habits, in order to acquire the first public transportation travelling strategy that is more suitable for the travelling habits of the user, the designated public transportation route in the first travelling habit information can be acquired. According to the starting public station, the terminating public station and the designated public transportation route, the first public transportation travelling strategy is acquired. The first public transportation travelling strategy includes a designated public transportation route from the starting public station directed to the terminating public station.

For example, from public station A to public station B, public transportation vehicles respectively corresponding to public transportation route 1, public transportation route 2, and public transportation route 3 can be taken. When the user departs from the public station A to the public station B, the public transportation route corresponding to the public transportation route 1 is usually taken, that is, the designated public transportation route is the public transportation route 1. In this case, when the user appears again within the first preset range of public station A, the first public transportation travelling strategy including public transportation route 1 is acquired.

By acquiring the first public transportation travelling strategy based on the starting public station, the terminating public station and the designated public transportation route, it can provide a travelling strategy more suitable for the user's own situation and can improve the matching degree between the travelling strategy and the user travelling habit.

In step 1404, the first public transportation travelling strategy is displayed on the designated interface.

The designated interface includes at least one information display area, and one or more types of information can be displayed in each information display area, and multiple types of information can be aggregated and displayed on the designated interface.

In some embodiments, the designated interface includes at least one of a first information display area, a second information display area, and a third information display area.

1. The first information display area, which can be referred to as a shortcut function area.

The first information display area is for displaying one or more function options for the user to use.

Function options can include startup options for applications, startup options for application interfaces, and startup options for tools.

Wherein, a startup option for an application is used to start the application, which can be an application icon or a startup button of the application. When the user triggers the startup option, the electronic device can start the application.

A startup option for an application interface is used to start the application interface, and the application interface can be an interface running in an operating system of the electronic device, or an interface running in a third-party application, such as a permission setting interface running in the operating system, or a chat interface in a chat application. When the user triggers the startup option, the electronic device can start the application interface, that is, the application interface is directly displayed without displaying the main interface or other interface of the application to which the application interface belongs.

A startup option for a tool is used to start the tool, which can be a sweep, a calculator, an alarm, a memo, etc. When the user triggers the start option, the tool is started.

2. The second information display area, which can be referred to as a dynamic information area.

The dynamic information area is used to display dynamic information recommended by the electronic device for the user, such as popular news, popular merchandise, train tickets, movie tickets, schedule information, stock quotes, travelling strategies, and the like. The user can check the dynamic information, and can also trigger the dynamic information to enter the presentation interface of the dynamic information. The presentation interface includes the description information of the dynamic information, and the user can learn about the details of the dynamic information in the presentation interface. The user can learn about the details of the dynamic information in the display interface, and can also trigger one or more operations to process the objects involved in the dynamic information.

For example, the dynamic information is popular merchandise, and the user clicks on the popular merchandise to enter the presentation interface of the popular merchandise. The presentation interface includes description information about the type, price, size, and style of the popular merchandise, and the merchandise is described from all aspects. The user can check the description information and also trigger an operation to purchase the merchandise.

The recommended dynamic information can be updated over time or according to the user-triggered operation, and the electronic device updates the displayed dynamic information in the second information display area to display the updated dynamic information.

3. The third information display area, which can be referred to as a presentation area.

The third information display area can present information commonly used by the user, such as time information, weather information, and number of walking steps. The type of information presented in the third information display area can be set by the electronic device by default or set by the user.

It should be noted that other information display areas can be included on the designated interface, and other types of information can also be displayed, details of which will not be described herein. Moreover, the information on the designated interface can be provided by an operating system of the electronic device, or provided by a third-party application installed on the electronic device, or can be provided through other channels. By integrating the information provided through one or more channels, sub-areas can be displayed on the designated interface. It can realize the aggregation display of various types of information, ensure organized display, which is convenient for the user to check various types of information altogether.

Wherein, the plurality of information display areas can be arranged in a predetermined manner when the designated interface includes a plurality of information display areas, and the predetermined manner can be a top-to-bottom manner or other manners, which is not limited in this embodiment.

In some embodiments, the designated interface can be triggered by a preset operation detected on the main interface. That is, when the electronic device displays the main interface, when the preset operation is detected, the designated interface is displayed.

In some embodiments, the designated interface is a minus one screen interface, which is located on the left side of the main interface. When the electronic device displays the main interface, when a rightward sliding operation is detected, the designated interface is displayed. Or the designated interface is located at the right side of the main interface. When the electronic device displays the main interface, when a leftward slide operation is detected, the designated interface is displayed. In some embodiments, the electronic device is provided with a preset button, and the button can be a physical button or a virtual button, and when a triggering operation on the preset button is detected, the designated interface is displayed.

By adopting the above triggering manner, the designated interface can be called out by one button, and the operation is very simple, facilitating the user to quickly check the information displayed on the designated interface.

Based on the above designated interface, when the electronic device acquires the first public transportation travelling strategy corresponding to the first travelling habit, the first public transportation travelling strategy is added to the designated interface. Once the designated interface is displayed when the preset operation is detected on the main interface, the first public transportation travelling strategy can be displayed in the designated interface.

The acquired first public transportation travelling strategy can include various information such as time spent and arrival time, etc., in addition to the public transportation route. The designated interface can display all the contents of the first public transportation travelling strategy, and can also display part of the first public transportation travelling strategy.

Wherein, when the acquired first public transportation travelling strategy includes a plurality of public transportation routes, the plurality of public transportation routes can be displayed on the designated interface for reference by the user.

In some embodiments, the process of displaying a plurality of public transportation routes on the designated interface, includes at least one of the following.

1. On the designated interface, a first preset number of public transportation vehicles in a short-to-long order of waiting time lengths are displayed. In this case, the displayed public transportation routes of the first preset number are public transportation routes corresponding to the public transportation vehicles that arrive at the starting public station more quickly.

2. On the designated interface, a second preset number of public transportation routes in a short-to-long order of travelling time lengths are displayed. In this case, the displayed public transportation routes of the second preset number are public transportation routes corresponding to the public transportation vehicles that take a shorter time from the starting public station to the terminating public station.

3. On the designated interface, a third preset number of public transportation vehicles in an early-to-late order of arriving times are displayed. In this case, considering the waiting time length and the travelling time length, the displayed public transportation routes of the third preset number are public transportation routes corresponding to the public transportation vehicles that arrive at the terminating public station earlier.

In step 1405, when the distance between the public transportation vehicle corresponding to the first public transportation travelling strategy and the starting public station is less than a first preset threshold, second prompt information is sent.

When the public transportation vehicle that the user wants to take is about to arrive at the starting public station, the user may miss the public transportation vehicle because the user is talking, watching the phone or focusing on other things, and does not notice the public transportation vehicle which the user is waiting for arrives. Therefore, in order to prevent the user from missing the public transportation vehicle which the user is waiting for, the user can be prompted when the public transportation vehicle is about to arrive at the starting public station.

To this end, a first preset threshold can be set, and when the distance between the public transportation vehicle corresponding to the first public transportation travelling strategy and the starting public station is less than the first preset threshold, the second prompt information is sent, the second prompt information is for prompting the user that the public transportation vehicle is about to arrive.

The second prompt information can be in the form of a text, and the electronic device can display the second prompt information in a text form on the designated interface or the main interface of the electronic device, and the user can know that the public transportation vehicle is about to arrive by checking the second prompt information in the text form. Alternatively, the second prompt information can be in the form of a voice, and the electronic device can send the second prompt information in the form of a voice. When the user hears the second prompt information in the voice form, the user can know that the public transportation vehicle is about to arrive. Alternatively, the second prompt information can be in the form of a vibration. When the electronic device vibrates, the user can know that the public transportation vehicle is about to arrive by sensing the vibration.

By sending the second prompt information, when the public transportation vehicle corresponding to the first public transportation travelling strategy is about to arrive at the starting public station, the user can be prompted in time, so as to prevent the user from missing the public transportation vehicle.

In a method according to some embodiments of the present disclosure, first travelling habit information is acquired, including at least a starting public station and a terminating public station, and it is determined whether the current location is within the first preset range of the starting public station, and the first public transportation travelling strategy corresponding to the first travelling habit information is acquired. The first public transportation travelling strategy can then be displayed on the designated interface. When the user appears in the first preset range of the starting public station of the habit, the first public transportation travelling strategy can be automatically acquired and displayed on the designated interface for the user's reference. The user does not need to take the initiative to perform multiple steps to check the first public transportation travelling strategy displayed on the designated interface, which can have lower requirements on the user and can improve the operation efficiency.

In addition, when the acquired first travelling habit information includes the preset departure time period, only when determining that the current location is within the first preset range of the starting public station, and the current time belongs to the preset departure time period, the public transportation travelling strategy is automatically acquired to avoid waste of resources caused by frequent acquiring public transportation travelling strategies and reduce the amount of calculation.

Moreover, when the acquired first travelling habit information includes the designated public transportation route, the public transportation travelling strategy corresponding to the starting public station, the terminating public station, and the designated public transportation route can be acquired. It can avoid acquiring public transportation routes that is not wanted by the user. It not only can avoid waste of resources, but also can provide a public transportation strategy that is more suitable for the user's own situation, which can improve the accuracy of recommendation.

Moreover, when the designated interface is triggered by the preset operation on the main interface, the user only needs to trigger the preset operation on the main interface to trigger the display of the designated interface, and check the public transportation travelling strategy displayed on the designated interface, without performing too many steps and the operation is very simple.

Moreover, by sending the second prompt information, when the public transportation vehicle corresponding to the first public transportation travelling strategy is about to arrive at the starting public station, the user can be prompted in time, so as to prevent the user from missing the public transportation vehicle.

Figure 16:
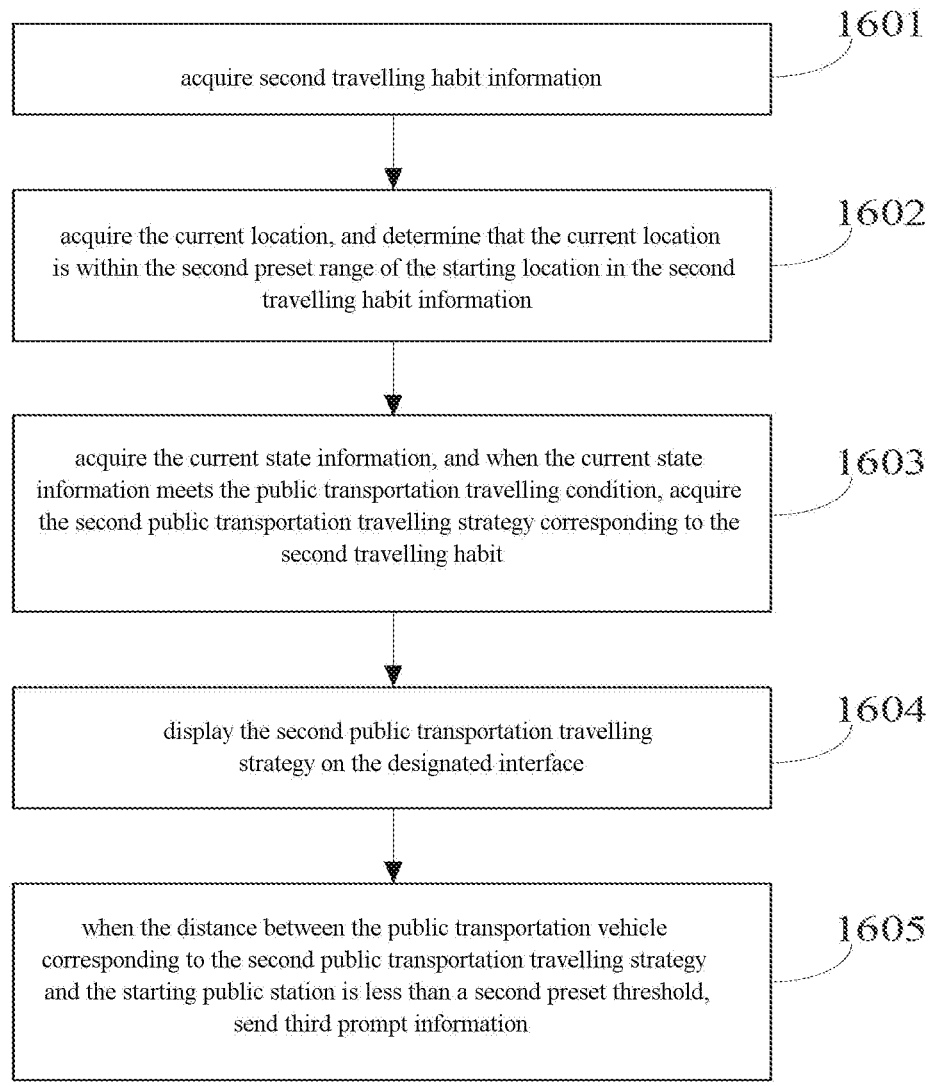
FIG. 16 is a flowchart of another method for displaying a travelling strategy based on public transportation according to some embodiments.

FIG. 16 is a flowchart of another method for displaying a travelling strategy based on public transportation according to some embodiments, illustrating a process of acquiring a public transportation travelling strategy according to second travelling habit information. As shown in FIG. 16, the process includes the following steps.

In step 1601, second travelling habit information is acquired.

The user can set the public transportation travelling mode as the designated travelling mode, or can set other travelling mode than the public transportation travelling mode as the designated travelling mode. The embodiment of the present disclosure illustrates a process of acquiring a public transportation travelling strategy by taking, for example, a travelling mode other than the public transportation travelling mode as the designated travelling mode.

Therefore, the acquired travelling habit information is travelling habit information under other travelling modes than the public transportation travelling mode, that is, the second travelling habit information.

The second travelling habit information can include one or more pieces, and each piece of second travelling habit information includes at least a starting location and a terminating location corresponding to each other. The second travelling habit information further includes a designated travelling mode, and the designated travelling mode is a travelling mode other than public transportation, such as a driving travelling mode, a taxi travelling mode, a subway travelling mode, a walking travelling mode, and a bicycle travelling mode, etc.

In step 1602, the current location is acquired, and it is determined that the current location is within the second preset range of the starting location in the second travelling habit information.

The electronic device acquires the current location, and determines whether the current location is within the second preset range of the starting location according to the current location and the starting location in the second travelling habit information. Wherein, the process of acquiring the current location can be implemented based on a positioning function of the electronic device, or can be implemented based on other manners.

If the current location is within the second preset range of the starting location, the user can be considered to travel from the starting location to the terminating location corresponding to the starting location. Therefore, the travelling strategy corresponding to the second travelling habit information is recommended for the user. If the current location is not within the first preset range of the starting location, then the user cannot be considered to be travelling, and there is no need to recommend a travelling strategy for the user.

Wherein, the second preset range refers to a circular range centered on the starting location and having a radius of the second preset distance, or can be a square range centered on the current location, or can be other types of scope.

In some embodiments, the second travelling habit information further includes a preset departure time period. The step 1602 can further include: acquiring the current location and the current time, determining that the current location is within the second preset range of the starting location in the second travelling habit information, and the current time belongs to the preset departure time period.

In step 1603, the current state information is acquired, and when the current state information meets the public transportation travelling condition, the second public transportation travelling strategy corresponding to the second travelling habit is acquired.

The second public transportation travelling strategy includes a public transportation route from a public station corresponding to the starting location directed to a public station corresponding to the terminating location.

When the designated travelling mode is not the public transportation travelling mode, but the public transportation travelling conditions are met according to the current state information, the second public transportation travelling strategy can be acquired. Depending on the different designated travelling modes, the process of acquiring the second public transportation travelling strategy corresponding to the second travelling habit according to the current state information includes the following three situations.

(1) The designated travelling mode is a driving travelling mode.

The increasing number of vehicles has brought about environmental pollution and road congestion, which has led to sharply increased pressure on traffic. In order to alleviate the problem and reduce the traffic burden, a driving restriction rule has been established. The driving restriction rule stipulates whether a certain vehicle is allowed to be driven within a specified restricted area within a time period.

Wherein, when the designated travelling mode is the driving travelling mode, the second travelling habit information further includes a driving travelling mode and a vehicle identification of a designated vehicle, and the current state information is acquired. If the current state information is that the designated vehicle is decided to be prohibited from travelling as determined according to the driving restriction rule and the vehicle identification, second public transportation travelling strategy corresponding to the starting location and the terminating location is acquired.

The driving restriction rule stipulates a current driving restriction area for each type of vehicle identifications, to prohibit the vehicle corresponding to respective vehicle identification to travel in the driving restriction area. For the designated vehicle, when the travelling route of the designated vehicle is located in the driving restricted area corresponding to the vehicle identification of the designated vehicle, or when the travelling route of the designated vehicle includes the road section corresponding to the driving restricted area corresponding to the vehicle identification of the designated vehicle, the designated vehicle is decided to be prohibited from travelling.

The process of acquiring the second public transportation travelling strategy corresponding to the starting location and the terminating location, includes: acquiring a first public station corresponding to the starting location, acquiring a second public station corresponding to the terminating location, and acquiring a second public transportation travelling strategy including a public transportation route from the first public station directed to the second public station.

In some embodiments, the process of acquiring the second public transportation travelling strategy corresponding to the starting location and the terminating location can further include: acquiring at least one of a distance, a route between the current location and the first public station, or a time length required to walk from the current location to the first public station. By acquiring these public transportation strategies, users can be helped to reach the first public station from the current location for subsequent public transportation travelling.

(2) The designated travelling mode is a walking travelling mode or a bicycle travelling mode.

When the destination is closer to the current location, the user generally chooses the walking travelling mode or the bicycle travelling mode.

In some embodiments, when the designated travelling mode is a walking travelling mode or a bicycle travelling mode, the current state information further includes current weather information. The current weather information is acquired, and if it is determined that the current weather is bad weather according to the current weather information, second public transportation travelling strategy corresponding to the starting location and the terminating location is acquired. Wherein the bad weather is weather that is not suitable for the walking travelling or bicycle travelling.

In some embodiments, a preset departure time of the starting location is preset, and when the designated travelling mode is the walking travelling mode or the bicycle travelling mode, if the current time is later than the preset departure time of the starting location, second public transportation travelling strategy corresponding to the starting location and the terminating location is acquired.

In some embodiments, a preset arrival time of the terminating location is preset, and when the designated travelling mode is the walking travelling mode, a first arrival time of the walking route corresponding to the starting location, the terminating location, and the walking travelling mode is acquired. If the acquired first arrival time is later than the preset arrival time, second public transportation travelling strategy corresponding to the starting location and the terminating location is acquired.

In some embodiments, a preset arrival time of the terminating location is preset, and when the designated travelling mode is the bicycle travelling mode, a second arrival time of the bicycle route corresponding to the starting location, the terminating location, and the bicycle travelling mode is acquired. If the acquired second arrival time is later than the preset arrival time, second public transportation travelling strategy corresponding to the starting location and the terminating location is acquired.

In the foregoing various possible implementations, the process of acquiring the second public transportation travelling strategy corresponding to the starting location and the terminating location is similar to the process of acquiring the second public transportation travelling strategy when the designated travelling mode is the driving travelling mode, details of which will not be described herein again.

(3) The designated travelling mode is a subway travelling mode.

When the designated travelling mode is the subway travelling mode, in some embodiments, the current state information further includes the subway operation status. A first subway station corresponding to the starting location and a second subway station corresponding to the terminating location are acquired. If it is determined according to the current state information that there is no subway route with the first subway station as a starting point and the second subway station as a termination and excluding faulty road section, second public transportation travelling strategy corresponding to the starting location and the terminating location is acquired.

The process of acquiring the second public transportation travelling strategy corresponding to the starting location and the terminating location is similar to the process of acquiring the second public transportation travelling strategy when the designated travelling mode is the driving travelling mode, details of which will not be described herein again.

In step 1604, the second public transportation travelling strategy is displayed on the designated interface.

When the electronic device acquires the second public transportation travelling strategy, the second public transportation travelling strategy is added to the designated interface, and the second public transportation travelling strategy is displayed on the designated interface.

The acquired second public transportation travelling strategy can include at least one of a travelling time length, an arrival time, a punctuality rate, or a waiting time length, in addition to the second public transportation travelling route. The designated interface can display all the contents of the second public transportation travelling strategy, and can also display part of the second public transportation travelling strategy. Subsequently, the user can check the second public transportation travelling strategy displayed on the designated interface, and travel on the public transportation vehicle based on the second public transportation travelling strategy.

In step 1605, when the distance between the public transportation vehicle corresponding to the second public transportation travelling strategy and the starting public station is less than a second preset threshold, third prompt information is sent.

In order to prevent the user from missing the public transportation vehicle which the user is waiting for, the user can be prompted when the public transportation vehicle is about to arrive at the starting public station.

To this end, a second preset threshold can be set, and when the distance between the public transportation vehicle corresponding to the second public transportation travelling strategy and the starting public station is less than the second preset threshold, the third prompt information is sent, the third prompt information is for prompting the user that the public transportation vehicle is about to arrive.

The third prompt information can be in the form of a text, and the third prompt information in a text form can be displayed on the designated interface or the main interface of the electronic device, and the user can know that the public transportation vehicle is about to arrive by checking the third prompt information in the text form. Alternatively, the third prompt information can be in the form of a voice. When the user hears the third prompt information in the voice form, the user can know that the public transportation vehicle is about to arrive. Alternatively, the third prompt information can be in the form of a vibration. The user can know that the public transportation vehicle is about to arrive by sensing the vibration.

The method provided by the embodiment of the present disclosure acquires second travelling habit information including at least a starting location and a terminating location. When the designated travelling mode is not the public transportation travelling mode, when it is determined that the current location is within the second preset range of the starting location and the current state information meets the public transportation travelling condition, second public transportation travelling strategy corresponding to the second travelling habit information is acquired, and displayed on the designated interface. When the user appears in the second preset range of the starting location of the habit, the second public transportation travelling strategy can be automatically acquired and displayed on the designated interface for the user's reference. The user does not need to take the initiative to perform multiple steps to check the second public transportation travelling strategy displayed on the designated interface, which can have lower requirements on the user and can improve the operation efficiency. In addition, the acquired second public transportation travelling strategy is more adaptable to the current actual situation.

Moreover, by sending the third prompt information, when the public transportation vehicle corresponding to the second public transportation travelling strategy is about to arrive at the starting public station, the user can be prompted in time, so as to prevent the user from missing the public transportation vehicle.

Figure 17:
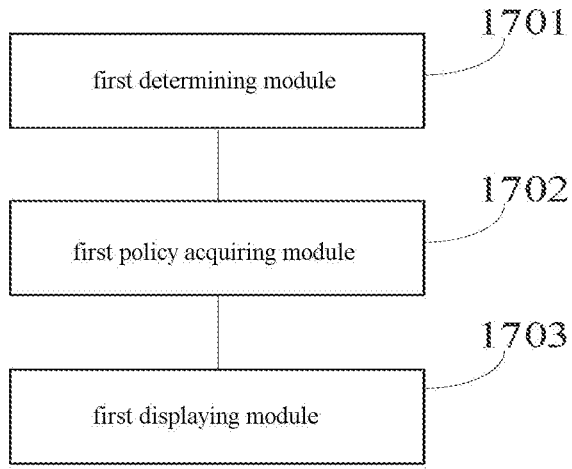
FIG. 17 is a schematic structural diagram of an apparatus for displaying a travelling strategy based on public transportation according to some embodiments.

FIG. 17 is a schematic structural diagram of an apparatus for displaying a travelling strategy based on public transportation according to some embodiments. As shown in FIG. 17, the apparatus includes a first determining module 1701, a first policy acquiring module 1702, and a first displaying module 1703.

The first determining module 1701 is configured to determine that a current location is within a first preset range of a starting public station in first travelling habit information, the first travelling habit information including at least a starting public station and a terminating public station corresponding to the starting public station The first policy acquiring module 1702 is configured to acquire a first public transportation travelling strategy, the first public transportation travelling strategy including a public transportation route from the starting public station directed to the terminating public station.

The first displaying module 1703 is configured to display the first public transportation travelling strategy on the designated interface.

In some embodiments, the first policy acquiring module 1702 includes at least one of the following:

a distance acquiring unit configured to acquire a distance between the current location and the starting public station;

a first route acquiring unit configured to a route between the current location and the starting public station;

a walking-time-length acquiring unit configured to acquire a time length required to walk from the current location to the starting public station;

a travelling-time-length acquiring unit configured to acquire a travelling time length corresponding to the public transportation route;

an arrival-time acquiring unit configured to acquire an arrival time determined according to the travelling time length corresponding to the public transportation route and a current time;

a punctuality-rate acquiring unit configured to acquire a punctuality rate of public transportation vehicles travelling on the public transportation route;

a state-information acquiring unit configured to acquire traffic state information of a public transportation road section between the starting public station and the terminating public station of the public transportation route; and a waiting-time-length acquiring unit configured to acquire a waiting time length, the waiting time length being, among a plurality of public transportation vehicles travelling on the public transportation route, a time length required for a public transportation vehicle having the shortest distance to the starting public station to arrive at the starting public station.

In some embodiments, the first policy acquiring module 1702 includes:

a second route acquiring unit configured to acquire a public transportation route from the starting public station directed to the terminating public station, and excluding the congested and faulty route sections.

In some embodiments, the first travelling habit information further includes a designated public transportation route, the designated public transportation route including a starting public station and terminating public station; and the first policy acquiring module 1702 includes:

a third route acquiring unit configured to acquire the designated public transportation route from the starting public station directed to the terminating public station.

In some embodiments, the first travelling habit information further includes a preset departure time period; and the first determining module 1701 includes:

a determining unit configured to determine that the current location is within the first preset range of the starting public station in the first travelling habit information, and the current time belongs to the preset departure time period.

In some embodiments, the apparatus further includes at least one of the following:

a first information acquiring module 1704 configured to acquire first travelling habit information provided by a third-party server;

a second information acquiring module 1705 configured to display a designated interface which comprises a travelling habit setting area, and acquire the first travelling habit information input in the travelling habit setting area; and a third information acquiring module 1706 configured to acquire a historical travelling record, the historical travelling record including a plurality of public transportation routes, and each public transportation route including at least a starting public station and a terminating public station corresponding to each other; and perform statistics on the plurality of public transportation routes to acquire the first travelling habit information.

In some embodiments, the apparatus further includes:

a first prompting module 1707 configured to, when the first travelling habit information has not been acquired, display first prompt information on the designated interface, the first prompt information being for prompting the user to input the first travelling habit information in the travelling habit setting area.

In some embodiments, the apparatus further includes:

a second prompting module 1708 configured to, when the distance between the public transportation vehicle corresponding to the first public transportation travelling strategy and the starting public station is less than a first preset threshold, send second prompt information, the second prompt information being for prompting the user that the public transportation vehicle is about to arrive.

In some embodiments, the first displaying module 1703 includes at least one of the following:

a first displaying unit configured to display a first preset number of public transportation vehicles in a short-to-long order of waiting time lengths on the designated interface;

a second displaying unit configured to display a second preset number of public transportation routes in a short-to-long order of travelling time lengths on the designated interface; and a third displaying unit configured to display a third preset number of public transportation vehicles in an early-to-late order of arriving times on the designated interface.

In some embodiments, the apparatus further includes:

a second determining module 1709 configured to determine that the current location is within a second preset range of a starting location in second travelling habit information, the second travelling habit information including at least a starting location and a terminating location corresponding to the starting location;

a second policy acquiring module 1710 configured to, when the current state information satisfies a public transportation travelling condition, acquire a second public transportation travelling strategy, the second public transportation travelling strategy including a public transportation route from a public station corresponding to the starting location directed to a public station corresponding to the terminating location; and a second displaying module 1711 configured to display the second public transportation travelling strategy on the designated interface.

In some embodiments, the second policy acquiring module 1710 includes:

the second travelling habit information further including a driving travelling mode and a vehicle identification of a designated vehicle, and a first policy acquiring unit configured to, when the designated vehicle is decided to be prohibited from travelling according to a driving restriction rule and the vehicle identification, acquire the second public transportation travelling strategy.

In some embodiments, the second policy acquiring module 1710 includes at least one of the following:

the second travelling habit information further including a walking travelling mode or a bicycle travelling mode, and a second strategy acquiring unit configured to acquire the second public transportation travelling strategy when the current weather is bad weather;

the second travelling habit information further including a walking travelling mode or a bicycle travelling mode, and, and a third strategy acquiring unit configured to acquire a starting location, a terminating location and an arrival time of a travelling route corresponding to the walking travelling mode, or acquire a starting location, a terminating location and an arrival time of a travelling route corresponding to the bicycle travelling mode, and if the acquired arrival time is later than a preset arrival time at the terminating location, acquire the second public transportation travelling strategy; and the second travelling habit information including a walking travelling mode or a bicycle travelling mode, and, and a fourth policy acquiring unit configured to acquire the second public transportation travelling strategy if the current time is later than the preset departure time at the starting location.

In some embodiments, the second policy acquiring module 1710 includes:

the second travelling habit information further including a subway travelling mode, and a fifth strategy acquiring unit configured to acquire the second public transportation travelling strategy if there is no subway route with a first subway station corresponding to the starting location as a starting point and a second subway station corresponding to the terminating location as a termination and excluding faulty route section.

Figure 18:
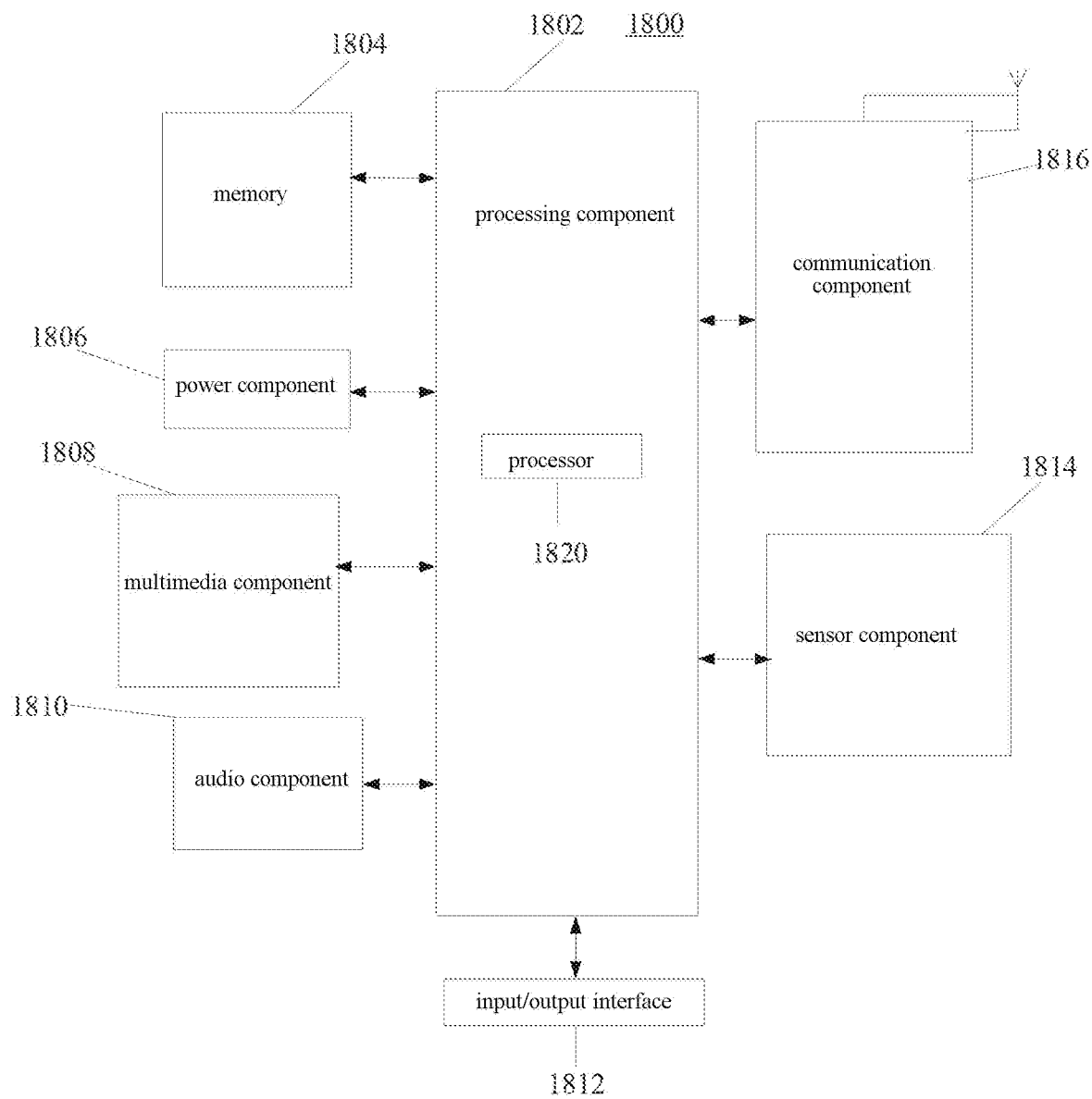
FIG. 18 is a block diagram of an electronic device according to some embodiments.

FIG. 18 is a block diagram of a terminal 1800 according to some embodiments. For example, the terminal 1800 may be a mobile phone, a computer, a digital broadcast device, a messaging device, a gaming console, a tablet, a medical device, exercise equipment, a personal digital assistant, and the like.

Referring to FIG. 18, the terminal 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 typically controls overall operations of the terminal 1800, such as the operations associated with display, telephone calls, data communications, camera operations, and recording operations. The processing component 1802 may include one or more processors 1820 to execute instructions, to perform all or part of the steps of the above method. Moreover, the processing component 1802 may include one or more modules which facilitate the interaction between the processing component 1802 and other components. For instance, the processing component 1802 may include a multimedia module to facilitate the interaction between the multimedia component 1808 and the processing component 1802.

The memory 1804 is configured to store various types of data to support the operation of the terminal 1800. Examples of such data include instructions for any applications or methods operated on the terminal 1800, contact data, phonebook data, messages, pictures, video, etc. The memory 1804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the terminal 1800. The power component 1806 may include a power management system, one or more power sources, and any other components associated with the generation, management, and distribution of power in the terminal 1800.

The multimedia component 1808 includes a screen providing an output interface between the terminal 1800 and the user. In some embodiments, the screen may include a liquid crystal display (LCD) and a touch panel (TP). In some embodiments, the screen can include an OLED (organic light emitting diode) display, or other types of displays.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1808 includes a front camera and/or a rear camera. The front camera and the rear camera may receive an external multimedia datum while the terminal 1800 is in an operation mode, such as a photographing mode or a video mode. Each of the front camera and the rear camera may be a fixed optical lens system or have focus and optical zoom capability.

The audio component 1810 is configured to output and/or input audio signals. For example, the audio component 1810 includes a microphone ("MIC") configured to receive an external audio signal when the terminal 1800 is in an operation mode, such as a call mode, a recording mode, and a voice recognition mode. The received audio signal may be further stored in the memory 1804 or transmitted via the communication component 1816. In some embodiments, the audio component 1810 further includes a speaker to output audio signals.

The I/O interface 1812 provides an interface between the processing component 1802 and peripheral interface modules, such as a keyboard, a click wheel, buttons, and the like. The buttons may include, but are not limited to, a home button, a volume button, a starting button, and a locking button.

The sensor component 1814 includes one or more sensors to provide status assessments of various aspects of the terminal 1800. For instance, the sensor component 1814 may detect an open/closed status of the terminal 1800, relative positioning of components, e.g., the display and the keypad, of the terminal 1800, a change in position of the terminal 1800 or a component of the terminal 1800, a presence or absence of user contact with the terminal 1800, an orientation or an acceleration/deceleration of the terminal 1800, and a change in temperature of the terminal 1800. The sensor component 1814 may include a proximity sensor configured to detect the presence of nearby objects without any physical contact. The sensor component 1814 may also include a light sensor, such as a CMOS or CCD image sensor, for use in imaging applications. In some embodiments, the sensor component 1814 may also include an accelerometer sensor, a gyroscope sensor, a magnetic sensor, a pressure sensor, or a temperature sensor.

The communication component 1816 is configured to facilitate communication, wired or wirelessly, between the terminal 1800 and other devices. The terminal 1800 can access a wireless network based on a communication standard, such as WiFi, 2G, 3G, 4G, 5G, or a combination thereof. In one exemplary embodiment, the communication component 1816 receives a broadcast signal or broadcast associated information from an external broadcast management system via a broadcast channel. In one exemplary embodiment, the communication component 1816 further includes a near field communication (NFC) module to facilitate short-range communications.

In exemplary embodiments, the terminal 1800 may be implemented with one or more processing circuits or processors such as application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above method for displaying a travelling strategy based on public transportation.

In exemplary embodiments, there is also provided a non-transitory computer-readable storage medium including instructions, such as included in the memory 1804, executable by the processor 1820 in the terminal 1800 to perform the above method for compensating an operating parameter of a display unit. For example, the non-transitory computer-readable storage medium may be a ROM, a RAM, a CD-ROM, a magnetic tape, a floppy disc, an optical data storage device, and the like.

A person skilled in the art can understand that all or part of the steps of implementing the above embodiments can be completed by hardware, or can be instructed by a program to execute related hardware, and the program can be stored in a machine-readable storage medium, such as a non-transitory computer-readable storage medium. The above-mentioned storage medium can be a read only memory, a magnetic disk or an optical disk or the like.

The various device components, units, blocks, or portions may have modular configurations, or are composed of discrete components, but nonetheless can be referred to as "modules" in general. In other words, the "components," "portions," "modules" or "units" referred to herein may or may not be in modular forms.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for displaying a travelling strategy based on public transportation, the method comprising:
    acquiring, by an electronic device, first travelling habit information comprising at least a starting public station, a terminating public station corresponding to the starting public station, and a preset departure time period;
    acquiring, by the electronic device, a current location and a current time, and determining that the current location is within a first preset range of a starting public station in first travelling habit information, and that the current time belongs to the preset departure time period;
    in response to determination that the current location is within the first preset range of the starting public station and that the current time belongs to the preset departure time period, automatically acquiring, by the electronic device without user operation, a first public transportation travelling strategy corresponding to the first travelling habit information, and adding, by the electronic device, the first public transportation travelling strategy to a designated interface, the first public transportation travelling strategy comprising a public transportation route from the starting public station directed to the terminating public station; and
    in response to a preset operation on a main interface of the electronic device for displaying the designated interface, displaying the first public transportation travelling strategy on the designated interface.

2. The method according to claim 1, wherein the acquiring a first public transportation travelling strategy comprises at least one of:
    acquiring a distance between the current location and the starting public station;
    acquiring a route between the current location and the starting public station;
    acquiring a time length required to walk from the current location to the starting public station;
    acquiring a travelling time length corresponding to the public transportation route;
    acquiring an arrival time determined according to the travelling time length corresponding to the public transportation route and a current time;
    acquiring a punctuality rate of public transportation vehicles travelling on the public transportation route;
    acquiring traffic state information of a public transportation road section between the starting public station and the terminating public station of the public transportation route; and
    acquiring a waiting time length, the waiting time length being, among a plurality of public transportation vehicles travelling on the public transportation route, a time length required for a public transportation vehicle having the shortest distance to the starting public station to arrive at the starting public station; or
    acquiring a public transportation route from the starting public station directed to the terminating public station, and excluding the congested and faulty route sections.

3. The method according to claim 1, wherein the first travelling habit information further comprises a designated public transportation route, the designated public transportation route comprising a starting public station and terminating public station; and
    the acquiring a first public transportation travelling strategy comprises:
    acquiring the designated public transportation route from the starting public station directed to the terminating public station.

4. The method according to claim 1, further comprising at least one of:
    acquiring first travelling habit information provided by a third-party server;
    displaying a designated interface which comprises a travelling habit setting area, and acquiring the first travelling habit information input in the travelling habit setting area; or
    acquiring a historical travelling record, the historical travelling record comprising a plurality of public transportation routes, and each public transportation route comprising at least a starting public station and a terminating public station corresponding to each other; and performing statistics on the plurality of public transportation routes to acquire the first travelling habit information.

5. The method according to claim 4, further comprising:
    in a situation that the first travelling habit information has not been acquired, displaying first prompt information on the designated interface, the first prompt information being for prompting the user to input the first travelling habit information in the travelling habit setting area.

6. The method according to claim 1, further comprising:
    in a situation that a distance between the public transportation vehicle corresponding to the first public transportation travelling strategy and the starting public station is less than a first preset threshold, sending second prompt information, the second prompt information being for prompting the user that the public transportation vehicle is about to arrive.

7. The method according to claim 1, wherein the displaying the first public transportation travelling strategy on the designated interface comprises at least one of:
    displaying a first preset number of public transportation vehicles in a short-to-long order of waiting time lengths on the designated interface;
    displaying a second preset number of public transportation routes in a short-to-long order of travelling time lengths on the designated interface; or
    displaying a third preset number of public transportation vehicles in an early-to-late order of arriving times on the designated interface.

8. The method according to claim 1, further comprising:
    determining that the current location is within a second preset range of a starting location in second travelling habit information, the second travelling habit information comprising at least a starting location and a terminating location corresponding to the starting location;
    when the current state information satisfies a public transportation travelling condition, acquiring a second public transportation travelling strategy, the second public transportation travelling strategy comprising a public transportation route from a public station corresponding to the starting location directed to a public station corresponding to the terminating location; and
    displaying the second public transportation travelling strategy on the designated interface.

9. The method according to claim 8, wherein the acquiring a second public transportation travelling strategy comprises:

the second travelling habit information further comprising a driving travelling mode and a vehicle identification of a designated vehicle, and when the designated vehicle is decided to be prohibited from travelling according to a driving restriction rule and the vehicle identification, acquiring the second public transportation travelling strategy.

10. The method according to claim 8, wherein the acquiring a second public transportation travelling strategy comprises at least one of:

the second travelling habit information further comprising a walking travelling mode or a bicycle travelling mode, acquiring a starting location, a terminating location and an arrival time of a travelling route corresponding to the walking travelling mode, or acquiring a starting location, a terminating location and an arrival time of a travelling route corresponding to the bicycle travelling mode, and when the acquired arrival time is later than a preset arrival time at the terminating location, acquiring the second public transportation travelling strategy; or the second travelling habit information further comprising a walking travelling mode or a bicycle travelling mode, and when the current time is later than the preset departure time at the starting location, acquiring the second public transportation travelling strategy.

11. The method according to claim 8, wherein the acquiring a second public transportation travelling strategy comprises:

the second travelling habit information further comprising a subway travelling mode, when there is no subway route with a first subway station corresponding to the starting location as a starting point and a second subway station corresponding to the terminating location as a termination and excluding faulty route section, acquiring the second public transportation travelling strategy.

12. An apparatus for displaying a travelling strategy based on public transportation, the apparatus comprising:
one or more processors;
a volatile or non-volatile memory for storing one or more processor-executable instructions;
wherein the one or more processors are configured to perform operations of:
acquiring first travelling habit information comprising at least a starting public station, a terminating public station corresponding to the starting public station, and a preset departure time period;
acquiring a current location and a current time, and determining that the current location is within a first preset range of a starting public station in first travelling habit information, and that the current time belongs to the preset departure time period;
in response to determination that the current location is within the first preset range of the starting public station and that the current time belongs to the preset departure time period, automatically acquiring, without user operation, a first public transportation travelling strategy corresponding to the first travelling habit information, and adding the first public transportation travelling strategy to a designated interface, the first public transportation travelling strategy comprising a public transportation route from the starting public station directed to the terminating public station; and
in response to a preset operation on a main interface of the electronic device for displaying the designated interface, displaying the first public transportation travelling strategy on the designated interface.

13. The apparatus according to claim 12, wherein the acquiring a first public transportation travelling strategy comprises at least one of:
acquiring a distance between the current location and the starting public station;
acquiring a route between the current location and the starting public station;
acquiring a time length required to walk from the current location to the starting public station;
acquiring a travelling time length corresponding to the public transportation route;
acquiring an arrival time determined according to the travelling time length corresponding to the public transportation route and a current time;
acquiring a punctuality rate of public transportation vehicles travelling on the public transportation route;
acquiring traffic state information of a public transportation road section between the starting public station and the terminating public station of the public transportation route;
acquiring a waiting time length, the waiting time length being, among a plurality of public transportation vehicles travelling on the public transportation route, a time length required for a public transportation vehicle having the shortest distance to the starting public station to arrive at the starting public station; or
acquiring a public transportation route from the starting public station directed to the terminating public station, and excluding the congested and faulty route sections.

14. The apparatus according to claim 12, wherein the one or more processors are further configured to perform at least one of operations of:
acquiring first travelling habit information provided by a third-party server;
displaying a designated interface which comprises a travelling habit setting area, and acquiring the first travelling habit information input in the travelling habit setting area; or
acquiring a historical travelling record, the historical travelling record comprising a plurality of public transportation routes, and each public transportation route comprising at least a starting public station and a terminating public station corresponding to each other; and performing statistics on the plurality of public transportation routes to acquire the first travelling habit information.

15. The apparatus according to claim 12, wherein the one or more processors are further configured to perform operations of sending second prompt information, when a distance between the public transportation vehicle corresponding to the first public transportation travelling strategy and the starting public station is less than a first preset threshold, the second prompt information being for prompting the user that the public transportation vehicle is about to arrive.

16. The apparatus according to claim 12, wherein the displaying the first public transportation travelling strategy on the designated interface comprises at least one of:
displaying a first preset number of public transportation vehicles in a short-to-long order of waiting time lengths on the designated interface;
displaying a second preset number of public transportation routes in a short-to-long order of travelling time lengths on the designated interface; or displaying a third preset number of public transportation vehicles in an early-to-late order of arriving times on the designated interface.

17. The apparatus according to claim 12, wherein the one or more processors are further configured to perform operations of:
- determining that the current location is within a second preset range of a starting location in second travelling habit information, the second travelling habit information comprising at least a starting location and a terminating location corresponding to the starting location;
- when the current state information satisfies a public transportation travelling condition, acquiring a second public transportation travelling strategy, the second public transportation travelling strategy comprising a public transportation route from a public station corresponding to the starting location directed to a public station corresponding to the terminating location; and
- displaying the second public transportation travelling strategy on the designated interface.

18. The apparatus according to claim 17, wherein the acquiring a second public transportation travelling strategy comprises at least one of:
- the second travelling habit information further comprising a walking travelling mode or a bicycle travelling mode, acquiring a starting location, a terminating location and an arrival time of a travelling route corresponding to the walking travelling mode, or acquiring a starting location, a terminating location and an arrival time of a travelling route corresponding to the bicycle travelling mode, and when the acquired arrival time is later than a preset arrival time at the terminating location, acquiring the second public transportation travelling strategy; and
- the second travelling habit information further comprising a walking travelling mode or a bicycle travelling mode, and when the current time is later than the preset departure time at the starting location, acquiring the second public transportation travelling strategy.

19. A non-transitory computer-readable storage medium, wherein the computer readable storage medium stores at least one instruction loaded and executed by a processor to implement operations performed in a method for displaying a travelling strategy based on public transportation, the method comprises:
- acquiring, by an electronic device, first travelling habit information comprising at least a starting public station, a terminating public station corresponding to the starting public station, and a preset departure time period;
- acquiring, by the electronic device, a current location and a current time, and determining that the current location is within a first preset range of a starting public station in first travelling habit information, and that the current time belongs to the preset departure time period;
- in response to determination that the current location is within the first preset range of the starting public station and that the current time belongs to the preset departure time period, automatically acquiring, by the electronic device without user operation, a first public transportation travelling strategy corresponding to the first travelling habit information, and adding, by the electronic device, the first public transportation travelling strategy to a designated interface, the first public transportation travelling strategy comprising a public transportation route from the starting public station directed to the terminating public station; and
- in response to a preset operation on a main interface of the electronic device for displaying the designated interface, displaying the first public transportation travelling strategy on the designated interface.

* * * * *